(12) United States Patent
Jewell-Larsen et al.

(10) Patent No.: US 8,411,407 B2
(45) Date of Patent: Apr. 2, 2013

(54) REVERSIBLE FLOW ELECTROHYDRODYNAMIC FLUID ACCELERATOR

(75) Inventors: Nels Jewell-Larsen, Campbell, CA (US); Kenneth A. Honer, Santa Clara, CA (US); Matt Schwiebert, San Jose, CA (US); Hongyu Ran, Mountain View, CA (US); Piyush Savalia, San Jose, CA (US); Yan Zhang, San Jose, CA (US)

(73) Assignee: Tessera, Inc., San Jose, CA (US)

( * ) Notice: Subject to any disclaimer, the term of this patent is extended or adjusted under 35 U.S.C. 154(b) by 624 days.

(21) Appl. No.: 12/615,909

(22) Filed: Nov. 10, 2009

(65) Prior Publication Data

US 2010/0116464 A1    May 13, 2010

Related U.S. Application Data

(60) Provisional application No. 61/113,225, filed on Nov. 10, 2008.

(51) Int. Cl.
  *H01J 27/00* (2006.01)
(52) U.S. Cl. ........... 361/230; 165/96; 204/600; 204/450
(58) Field of Classification Search ........................ None
  See application file for complete search history.

(56) References Cited

U.S. PATENT DOCUMENTS

| | | | |
|---|---|---|---|
| 4,227,894 A * | 10/1980 | Proynoff | 96/58 |
| 5,601,164 A * | 2/1997 | Ohsaki et al. | 188/274 |
| 6,504,308 B1 | 1/2003 | Krichtafovitch et al. | |
| 6,603,268 B2 | 8/2003 | Lee | |
| 6,727,657 B2 | 4/2004 | Krichtafovitch et al. | |
| 7,029,564 B1 * | 4/2006 | Lock et al. | 204/643 |
| 7,157,704 B2 | 1/2007 | Krichtafovitch et al. | |
| 2004/0217720 A1 * | 11/2004 | Krichtafovitch et al. | 315/500 |
| 2005/0116166 A1 * | 6/2005 | Krichtafovitch et al. | 250/324 |
| 2006/0226787 A1 * | 10/2006 | Krichtafovitch et al. | 315/111.91 |
| 2009/0231268 A1 * | 9/2009 | Yamada | 345/107 |
| 2009/0261268 A1 | 10/2009 | Schwiebert et al. | |

OTHER PUBLICATIONS

Jewell-Larsen, "Modeling of corona-induced electrohydrodynamic flow with COMSOL multiphysics" Proceedings of the ESA Annual Meeting on Electrostatics 2008.
Jewell-Larsen, "Electrohydrodynamic (EHD) Cooled Laptop" 25th IEEE SEMI-THERM Symposium, Mar. 2009, 7 pages.
Jewell-Larsen, "Optimization and miniaturization of electrostatic air pumps for thermal management" University of Washington, 2004, 130 pages.

* cited by examiner

*Primary Examiner* — Rexford Barnie
*Assistant Examiner* — Angela Brooks
(74) *Attorney, Agent, or Firm* — Zagorin O'Brien Graham LLP

(57) ABSTRACT

Reversible flow may be provided in certain EHD device configurations that selectively energize corona discharge electrodes arranged to motivate flows in generally opposing directions. In some embodiments, a first set of one or more corona discharge electrodes is positioned, relative to a first array of collector electrode surfaces, to when energized, motivate flow in a first direction, while second set of one or more corona discharge electrodes is positioned, relative to a second array of collector electrode surfaces, to when energized, motivate flow in a second direction that opposes the first. In some embodiments, the first and second arrays of collector electrode surfaces are opposing surfaces of individual collector electrodes. In some embodiments, the first and second arrays of collector electrode surfaces are opposing surfaces of respective collector electrodes.

26 Claims, 15 Drawing Sheets

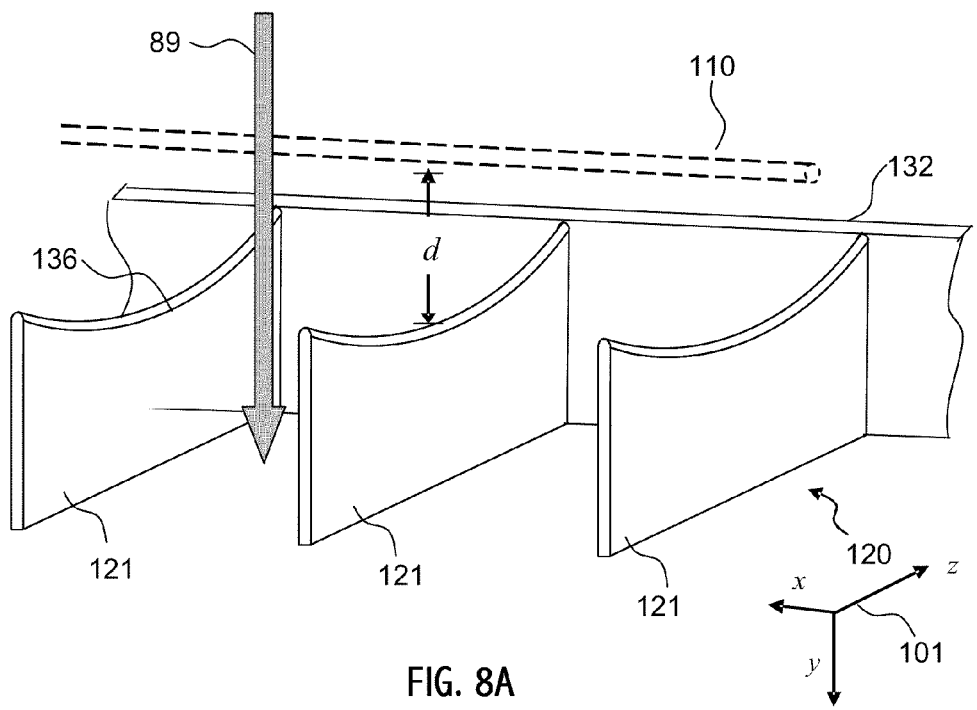
FIG. 8A
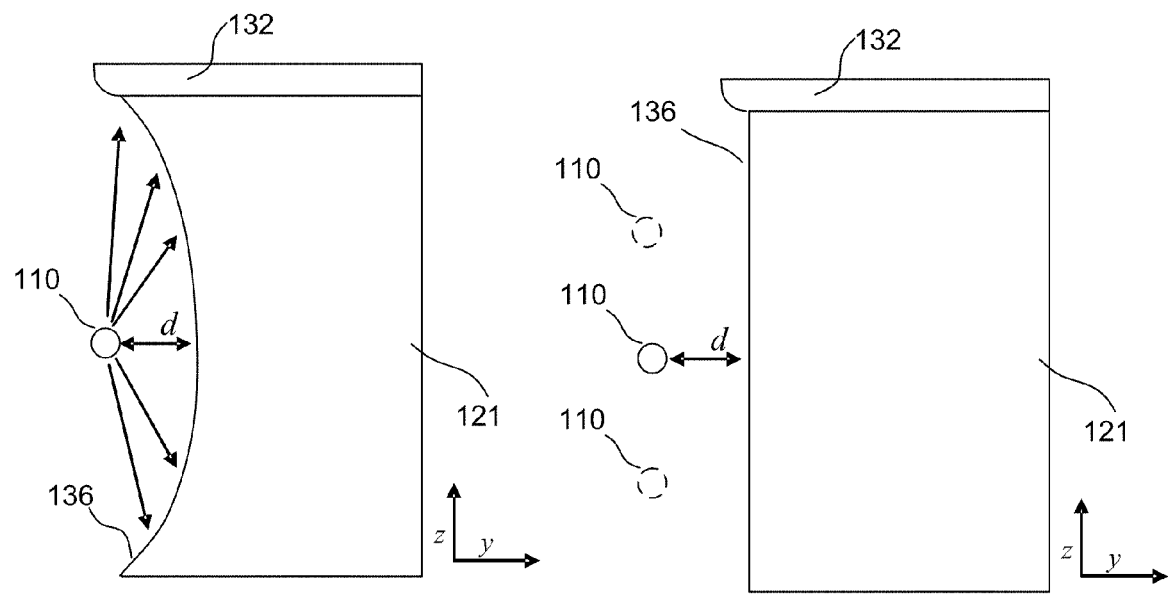
FIG. 8B
FIG. 8C

FIG. 19A                                   FIG. 19B

| Factor | | |
|---|---|---|
| Pressure Head | 1 – 20 Pa | 3 – 7 Pa |
| Aspect Ratio | 5 < L / H < 300 | 10 < L / H < 40 |
| | 5 < L / D < 150 | 10 < L / D < 30 |
| Flow Velocity | 0.1 – 3 m/s | 0.2 – 1.5 m/s |

REVERSIBLE FLOW ELECTROHYDRODYNAMIC FLUID ACCELERATOR

CROSS-REFERENCE TO RELATED APPLICATIONS

The present application claims the benefit of U.S. Provisional Application No. 61/113,225, filed Nov. 10, 2008. The present application is also related to commonly-owned, co-pending U.S. patent application Ser. No. 12/615,900, entitled "ELECTROHYDRODYNAMIC FLUID ACCELERATOR WITH HEAT TRANSFER SURFACES OPERABLE AS COLLECTOR ELECTRODE," naming Jewell-Larsen, Honer, Schwiebert, Ran, Savalia and Zhang as inventors, and to commonly-owned, co-pending U.S. patent application Ser. No. 12/615,905, entitled "SPATIALLY DISTRIBUTED VENTILATION BOUNDARY USING ELECTROHYDRODYNAMIC FLUID ACCELERATORS," naming Jewell-Larsen, Honer, Schwiebert, Ran, Savalia and Zhang as inventors, each filed on even date herewith.

BACKGROUND

1. Field

The present application relates to thermal management, and more particularly, to micro-scale cooling devices that use electrohydrodynamic (EHD, also known as electro-fluid-dynamic, EFD) technology to generate ions and electrical fields to control the movement of fluids, such as air, as part of a thermal management solution to dissipate heat.

2. Related Art

In general, electrohydrodynamic (EHD) technology uses corona discharge principles to move fluids (e.g., air molecules). Basic principles of EHD fluid flow are reasonably well understood by persons of skill in the art. Accordingly, a brief illustration of corona discharge principles in a simple two electrode system sets the stage for the more detailed description that follows.

With reference to the illustration in FIG. 1, corona discharge principles include applying a high intensity electric field between a first electrode 11 (often termed the "corona electrode," the "corona discharge electrode," the "emitter electrode" or just as the "emitter") and a second electrode 12. Fluid molecules, such as surrounding air molecules, near the corona discharge region 18 become ionized and form a stream 14 of ions 16 that accelerate toward second electrode 12, colliding with neutral fluid molecules 22. During these collisions, momentum is imparted from the stream 16 of ions 14 to the neutral fluid molecules 22, inducing a corresponding movement of fluid molecules 22 in a desired fluid flow direction, denoted by arrow 13, toward second electrode 12. Second electrode 12 is variously referred to as the "accelerating", "attracting", "collector" or "target" electrode. While stream 14 of ions 16 are attracted to, and neutralized by, second electrode 12, neutral fluid molecules 22 move past second electrode 12 at a certain velocity. The movement of fluid produced by corona discharge principles has been variously referred to as "electric," "corona" or "ionic" wind and has been defined as the movement of gas induced by the repulsion of ions from the vicinity of a high voltage discharge electrode.

Devices built using the principle of the ionic movement of a fluid are variously referred to in the literature as ionic wind machines, electric wind machines, corona wind pumps, electrostatic air accelerators, electro-fluid-dynamics (EFD) devices, electrostatic fluid accelerators (EFA), electrohydrodynamic (EHD) thrusters and EHD gas pumps. Some aspects of the technology have also been exploited in devices referred to as electrostatic air cleaners or electrostatic precipitators.

In the present application, embodiments of the devices illustrated and described herein are referred to as electrohydrodynamic fluid accelerator devices, also referred to in an abbreviated manner herein as "EHD devices", and are utilized as a component in a thermal management solution to dissipate heat generated by an electronic circuit.

SUMMARY

EHD devices may be employed to motivate flow of air in a thermal management system, such as employed to exhaust heat dissipated by integrated circuits in computing devices and electronics. For example, in devices such as laptop computers, compact scale, flexible form factor and absence of moving parts can provide design and user advantages over conventional forced air cooling technologies that rely exclusively on fans or blowers. EHD device solutions can operate silently (or at least comparatively so) with reduced volume and mass. In some cases, products incorporating EHD device solutions may be thinner and lighter than those employing conventional forced air cooling technologies. Flexible form factors of EHD devices can facilitate compelling product designs and, in some cases, may provide functional benefits.

It has been discovered that reversible flow may be provided in certain EHD device configurations that selectively energize corona discharge electrodes arranged to motivate flows in generally opposing directions. In some embodiments, a first set of one or more corona discharge electrodes is positioned, relative to a first array of collector electrode surfaces, to when energized, motivate flow in a first direction, while second set of one or more corona discharge electrodes is positioned, relative to a second array of collector electrode surfaces, to when energized, motivate flow in a second direction that opposes the first. In some embodiments, the first and second arrays of collector electrode surfaces are opposing surfaces of individual collector electrodes. In some embodiments, the first and second arrays of collector electrode surfaces are opposing surfaces of respective, though potentially distinct or segmented, collector electrodes.

In some embodiments, an electrohydrodynamic fluid accelerator includes an array of collector electrodes and first and second sets of one or more corona discharge electrodes, each having a longitudinal extent spanning a major dimension of the collector electrode array. The first set is positioned relative to first leading surfaces of at least a subset of the collector electrodes to, when energized, motivate fluid in a first flow direction through the collector electrode array. The second set is positioned relative to second leading surfaces of at least a subset of the collector electrodes to, when energized, motivate fluid through the collector electrode array in a second flow direction that differs from the first flow direction.

In some embodiments, the first and second leading surfaces are opposing surfaces of individual ones of the collector electrodes. In some embodiments, the first and second leading surfaces are opposing surfaces of respective subsets of the collector electrodes. In some embodiments, the electrohydrodynamic fluid accelerator further includes additional heat transfer surfaces interposed between the respective subsets of the collector electrodes.

In some embodiments, the electrohydrodynamic fluid accelerator further includes a high voltage source coupled to selectively energize either one or the other of the first and second sets of corona discharge electrodes.

In some embodiments, the first and second flow directions are generally opposing flow directions. In some embodiments, the first and second sets of corona discharge electrodes are positioned on opposing sides of the collector electrode array. In some embodiments, collector electrodes of the collector electrode array are spaced apart and have generally planar portions extending in a direction generally parallel to the first and second flow directions. In some further embodiments, the collector electrodes are oriented such that lateral extent of the generally planar portions thereof is generally orthogonally to the longitudinal extent of the corona discharge electrodes. In some embodiments, the collector electrodes are oriented such that leading surfaces thereof are generally parallel to the longitudinal extent of the corona discharge electrodes.

In some embodiments, the first set of corona discharge electrodes consists of a single corona discharge electrode. In some further embodiments, the collector electrodes each present a curved leading profile displaced from the single corona discharge electrode, the collector electrodes and the single corona discharge electrode operatively coupled between terminals of a high voltage source to establish a corona discharge therebetween and thereby accelerate the fluid flow in the first flow direction.

In some embodiments, the collector electrodes each present a leading surface displaced from the single corona discharge electrode, the leading surfaces arranged with respect to the single corona discharge electrode to present a generally curved array thereof, the collector electrodes and the single corona discharge electrode operatively coupled between terminals of a high voltage source to establish a corona discharge therebetween and thereby accelerate the fluid flow in the first flow direction. In some further embodiments, the second set of corona discharge electrodes also consists of a single corona discharge electrode.

In some embodiments, collector electrodes are thermally coupled as part of a heat transfer path to exchange heat with the motivated fluid flow.

In some embodiments, the electrohydrodynamic fluid accelerator is actually disposed in a flow path for ventilating an enclosure and thereby cooling one or more devices within the enclosure. The collector electrodes are then thermally coupled into a heat transfer path from the devices, and during operation fluid flow motivated through the collector electrode array dissipates heat therefrom.

In some embodiments, the electrohydrodynamic fluid accelerator is disposed in a flow path for ventilating an enclosure and thereby cooling one or more devices within the enclosure. The electrohydrodynamic fluid accelerator further includes additional heat transfer surfaces thermally coupled into a heat transfer path from the devices, and fluid flow motivated through the collector electrode array further dissipates heat from the additional heat transfer surfaces.

In some method embodiments in accordance with the present invention, a method includes operating an electrohydrodynamic fluid accelerator that includes an array of collector electrodes to, at a first time, motivate fluid in a first flow direction, and operating the electrohydrodynamic fluid accelerator to, at a second time, motivate fluid in a second flow direction. The electrohydrodynamic fluid accelerator includes at least first and second corona discharge electrodes disposed on different sides of the collector electrode array and each having a longitudinal extent that spans a major dimension of the collector electrode array. The method further includes, at the first time, selectively coupling the first corona discharge electrode to a high voltage source to establish a corona discharge and thereby accelerate the fluid flow in the first flow direction, and at the second time, selectively coupling the second corona discharge electrode to the high voltage source to establish a corona discharge and thereby accelerate the fluid flow in the second flow direction.

In some embodiments, the method further includes alternating between the first and second flow directions. In some embodiments, the different sides are generally opposing sides, and the first and second flow directions are generally opposing flow directions.

In some embodiments in accordance with the present invention, an apparatus includes an enclosure, a flow path for conveyance of air between ventilated boundary portions of the enclosure, and an electrohydrodynamic fluid accelerator disposed in the flow path for ventilating the enclosure and thereby cooling one or more devices disposed therein. The electrohydrodynamic fluid accelerator is operable at first and second times to accelerate flow of the air in respective first and second flow directions.

In some embodiments, the electrohydrodynamic fluid accelerator includes an array of collector electrodes and at least first and second corona discharge electrodes disposed on a different sides of the collector electrode array, each having a longitudinal extent that spans a major dimension of the collector electrode array. The first set is positioned relative to first leading surfaces of at least a subset of the collector electrodes to, when energized, motivate fluid in a first flow direction through the collector electrode array. The second set is positioned relative to second leading surfaces of at least a subset of the collector electrodes to, when energized, motivate fluid through the collector electrode array in a second flow direction that opposes the first flow direction.

In some embodiments, the electrohydrodynamic fluid accelerator includes a spaced apart array of collector electrodes and at least first and second corona discharge electrodes disposed on different sides of the collector electrode array, each having a longitudinal extent that spans a major dimension of the collector electrode array.

In some embodiments, the apparatus further includes a heat transfer path from the one or more devices to the collector electrodes. In some embodiments, the apparatus further includes additional heat transfer surfaces disposed in the flow path and a heat transfer path from the one or more devices to the additional heat transfer surfaces.

In some embodiments, the different sides are generally opposing sides; and the first and second flow directions are generally opposing flow directions.

Building on the foregoing, we present a variety of embodiments. In some embodiments, collector electrodes of the EHD device are themselves thermally coupled to a heat source such that at least some surfaces thereof act as fins of a heat exchanger. In some embodiments, the EHD device motivates flow of a fluid (typically air) past a heat exchanger that is thermally integrated with the collector electrodes. In some embodiments, multiple EHD device instances are ganged and/or staged so as to increase volume of flow, pressure or both. These and other embodiments will be understood with reference to the description that follows and with respect to the appended claims.

BRIEF DESCRIPTION OF THE DRAWINGS

The description of illustrative embodiments will be understood when read in connection with the accompanying drawings. Drawings are not necessarily to scale; emphasis has instead been placed upon illustrating the structural and fabrication principles of the described embodiments.

FIG. 5 depicts an illustrative single corona electrode configuration. FIG. 6 depicts an illustrative multiple corona electrode configuration. FIG. 7 depicts an illustrative ganged configuration.

FIG. 8A depicts a simplified perspective view, consistent with certain of the preceding EHD device configurations, of a corona discharge electrode and several orthogonally-oriented generally planar collector electrodes with curved leading surface profiles. FIG. 8B depicts a side cross-sectional view consistent with FIG. 8A. FIG. 8C depicts a side cross-sectional view for an alternative collector electrode geometry.

FIGS. 19A, 19B and 19C illustrate representative EHD device configurations in a thermal management solution context. In particular, FIG. 19A is a schematic drawing of a corona discharge electrode component and FIG. 19B is a schematic drawing of a first embodiment of a convective heat transfer component that includes collector electrodes. FIG. 19C illustrates an EHD device configuration that includes corona discharge electrode and convective heat transfer components of FIGS. 19A and 19B positioned proximate to a ventilated boundary portion of an enclosure.

The use of the same reference symbols in different drawings indicates similar or identical items.

DETAILED DESCRIPTION

Figure 1:
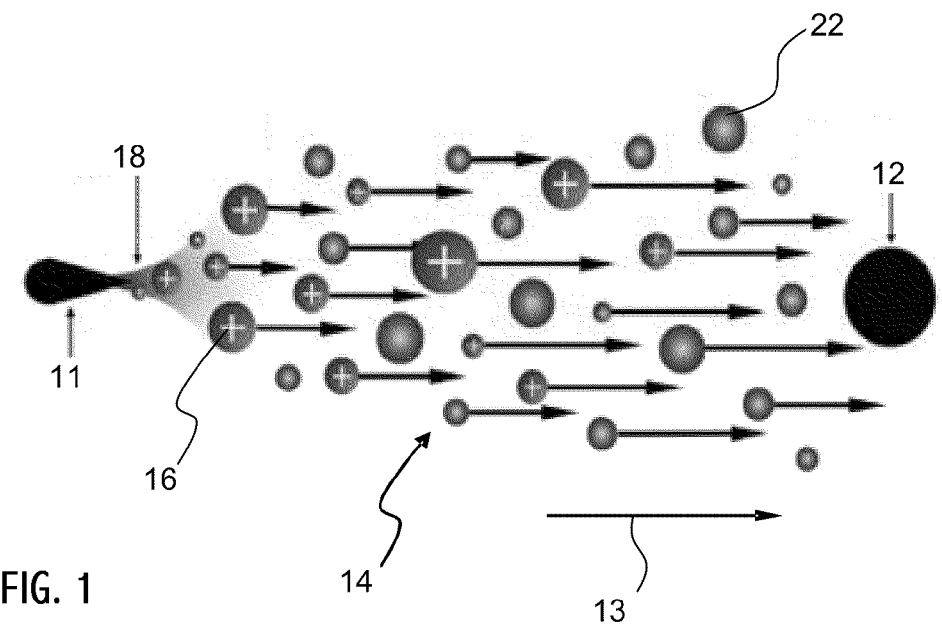
FIG. 1 is a graphical depiction of certain basic principles of corona-induced electrohydrodynamic (EHD) fluid flow.

Thermal management systems described herein employ EHD devices to motivate flow of air between ventilated boundary portions of an enclosure. In this way, heat dissipated by electronics (e.g., microprocessors, graphics units, etc.) and other components may be transferred to the air flow and exhausted. Typically, the thermal management system includes heat transfer paths (often implemented as heat pipes or using other technologies) to transfer heat from where it is dissipated (or generated) to a location (or locations) within the enclosure where air flow motivated by an EHD device (or devices) flows over heat transfer surfaces.

As described herein relative to certain illustrative embodiments, some heat transfer surfaces may act as collector electrodes and participate in EHD acceleration of fluid flow (typically air flow), while additional heat transfer surfaces are provided that do not substantially contribute to motivation of fluid flow. Those heat transfer surfaces that act as collector electrodes and those that do not substantially contribute to motivation of fluid flow are introduced at different positions along a flow path. In some embodiments, heat transfer surfaces that act as collector electrodes and those that do not are nonetheless integrated, either physically, thermally or both. For example, in some embodiments, additional heat transfer surfaces may be implemented as an extension structure that replicates unit structures of a collector electrode assembly, but for which no proximate corona discharge electrode establish a corona discharge. In such a configurations, some heat transfer structures of an integrated assembly participate in EHD acceleration of fluid flow, while others do not.

As described herein relative to certain illustrative embodiments, reversible flows may be provided in EHD device configurations that selectively energize corona discharge electrodes arranged to motivate flows in generally opposing directions. In some embodiments, a first set of one or more corona discharge electrodes is positioned, relative to a first array of collector electrode surfaces, to when energized, motivate flow in a first direction, while second set of one or more corona discharge electrodes is positioned, relative to a second array of collector electrode surfaces, to when energized, motivate flow in a second direction that opposes the first. In some embodiments, the first and second arrays of collector electrode surfaces are opposing surfaces of individual collector electrodes. In some embodiments, the first and second arrays of collector electrode surfaces are opposing surfaces of respective collector electrodes. The alternative sets of corona discharge electrodes are typically energized at different times consistent with a flow reversal objective or scheme.

As described herein relative to certain illustrative embodiments, in thermal management systems that employ EHD devices to motivate flow of air through an enclosure, spatial distribution of a ventilation boundary may facilitate reductions in flow resistance by reducing average transit distance for cooling air from an inlet portion of the ventilation boundary to an outlet portion. Some thermal management systems described herein distribute a ventilation boundary over opposing surfaces, adjacent surfaces or even a single surface of an enclosure while providing a short, "U" shaped, "L" shaped or generally straight-through flow path. In some cases, spatial distributions of the ventilation boundary facilitate or enable enclosure geometries for which conventional fan or blower ventilation would be impractical. In some cases, the provision of multiple portions of the ventilation boundary may allow the thermal management system to tolerate blockage or occlusion of a subset of the inlet and/or outlet portions and, when at least some of such portions are non-contiguous spatially-distributed, tolerance to a single cause of blockage or occlusion is enhanced. In some cases, thermal management solutions that distribute multiple EHD devices along a ventilation boundary with multiple, spatially distributed, input and output portions facilitate ventilation strategies that selectively energize individual ones of the EHD devices in a manner consistent with, and responsive to, cooling requirements.

In general, a variety of scales, geometries and other design variations are envisioned for collector electrodes, together with a variety of positional interrelationships between corona discharge and collector electrodes of a given EHD device. For concreteness of description, we focus on certain illustrative embodiments and certain illustrative surface profiles and positional interrelationships with other components. For example, in much of the description herein, plural planar collector electrodes are arranged in a parallel, spaced-apart array proximate to a corona discharge wire that is displaced from leading surfaces of the respective collector electrodes. In some embodiments, planar portions of the collector electrodes are oriented generally orthogonally to the longitudinal extent of a corona discharge wire. In other embodiments, orientation of collector electrodes is such that leading surfaces thereof are generally parallel to the longitudinal extent of a corona discharge wire. In some embodiments, other corona discharge electrode configurations are provided.

In some embodiments, leading surfaces present a curved arrangement or profile to a corona discharge electrode (or electrodes). In some embodiments, leading surfaces present other (e.g., non-curved) arrangements or profiles to a corona discharge electrode (or electrodes). In some thermal management system embodiments, collector electrodes provide significant heat transfer to fluid flows motivated therethrough or thereover. In some thermal management system embodiments, heat transfer surfaces that do not participate substantially in EHD fluid acceleration may provide the substantial, even dominant, heat transfer.

It will be understood that particular EHD design variations are included for purposes of illustration and, persons of ordinary skill in the art will appreciate a broad range of design variations consistent with the description herein. In some cases, and particularly in the illustration of flow paths, EHD designs are illustrated simply as a corona discharge electrode assembly and a collector electrode assembly proximate each other; nonetheless, such illustrations within the broad context of a full range of EHD design variations are described herein.

Although embodiments of the present invention are not limited thereto, much of the description herein builds upon enclosure geometries, air flows, and heat transfer paths typical of laptop-type computer electronics and will be understood in view of that descriptive context. Of course, the described embodiments are merely illustrative and, notwithstanding the particular context in which any particular embodiment is introduced, persons of ordinary skill in the art having benefit of the present description will appreciate a wide range of design variations and exploitations for the developed techniques and configurations. Indeed, EHD device technologies present significant opportunities for adapting structures, geometries, scale, flow paths, controls and placement to meet thermal management challenges in a wide range of applications and systems. Moreover, reference to particular materials; dimensions, electrical field strengths; exciting voltages, currents and/or waveforms; packaging or form factors, thermal conditions, loads or heat transfer conditions and/or system designs or applications is merely illustrative. In view of the foregoing and without limitation on the range of designs encompassed within the scope of the appended claims, we now describe certain illustrative embodiments.

Electrohydrodynamic (EHD) Fluid Acceleration, Generally

Basic principals of electrohydrodynamic (EHD) fluid flow are well understood in the art and, in this regard, an article by Jewell-Larsen, N. et al., entitled "Modeling of corona-induced electrohydrodynamic flow with COMSOL multiphysics" (in the *Proceedings of the ESA Annual Meeting on Electrostatics* 2008) (hereafter, "the Jewell-Larsen Modeling article"), provides a useful summary. Likewise, U.S. Pat. No. 6,504,308, filed Oct. 14, 1999, naming Krichtafovitch et al. and entitled "Electrostatic Fluid Accellerator" describes certain electrode and high voltage power supply configurations useful in some EHD devices. U.S. Pat. No. 6,504,308, together with sections I (Introduction), II (Background), and III (Numerical Modeling) of the Jewell-Larsen Modeling article are hereby incorporated by reference herein for all that they teach.

Note that the simple illustration of corona-induced electrohydrodynamic fluid flow shown in FIG. 1 (which has been adapted from the Jewell-Larsen Modeling article and discussed above) includes shapes for first electrode 10 and second electrode 12 that are particular to the simple illustration thereof. Likewise, the electrode configurations illustrated in U.S. Pat. No. 6,504,308 and aspects of the power supply design are particular thereto. Accordingly, such illustrations, while generally useful for context, are not intended to limit the range of possible electrode or high voltage power supply designs in any particular embodiment of the present invention.

Figure 2A:
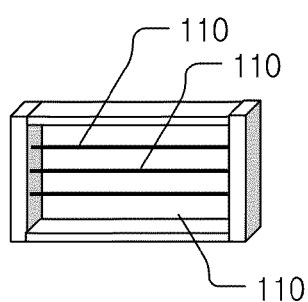
FIG. 2A is a simplified perspective view of a corona discharge electrode assembly.
Figure 2B:
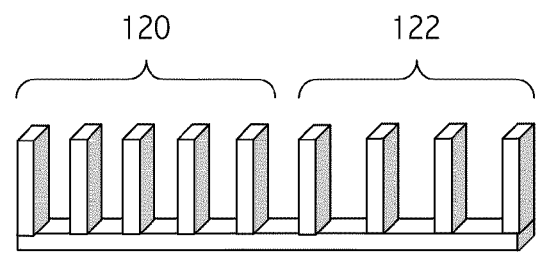
FIG. 2B is a simplified perspective view of a collector electrode assembly.

FIGS. 2A and 2B are simplified perspective views of corona discharge electrode and collector electrode assemblies that may be positioned and energized to induce EHD fluid flow. The corona discharge electrode assembly includes multiple corona discharge electrodes 110 supported by a frame fabricated from dielectric material(s) to provide electrical isolation from other components (including collector electrodes 120) of an EHD device. Corona discharge electrodes 110 have small radii of curvature and, in some embodiments, may take the form of wires or rods. Other shapes are also possible; for example, corona discharge electrode 110 may take the shape of barbed wire, a band, blade or place that, in some embodiments, may present a knife- or serrated-edge. In some embodiments, a cross-section such as illustrated in FIG. 1 for electrode 10 may be employed. Typically, a small radius of curvature or sharp point tends to facilitate ion production at an appropriate point when high voltage is applied.

In general, corona discharge electrodes 110 may be fabricated in a wide range of materials. For example, in some embodiments, compositions such as described in U.S. Pat. No. 7,157,704, filed Dec. 2, 2003, entitled "Corona Discharge Electrode and Method of Operating the Same" and naming Krichtafovitch et al. as inventors may be employed. U.S. Pat. No. 7,157,704 is incorporated herein for the limited purpose of describing materials for some corona discharge electrodes that may be employed in some embodiments. In general, a high voltage power supply (not specifically shown) creates the electric field between corona discharge electrodes 110 and collector electrodes 120.

Ventilated Boundary Variations

Figure 2C:
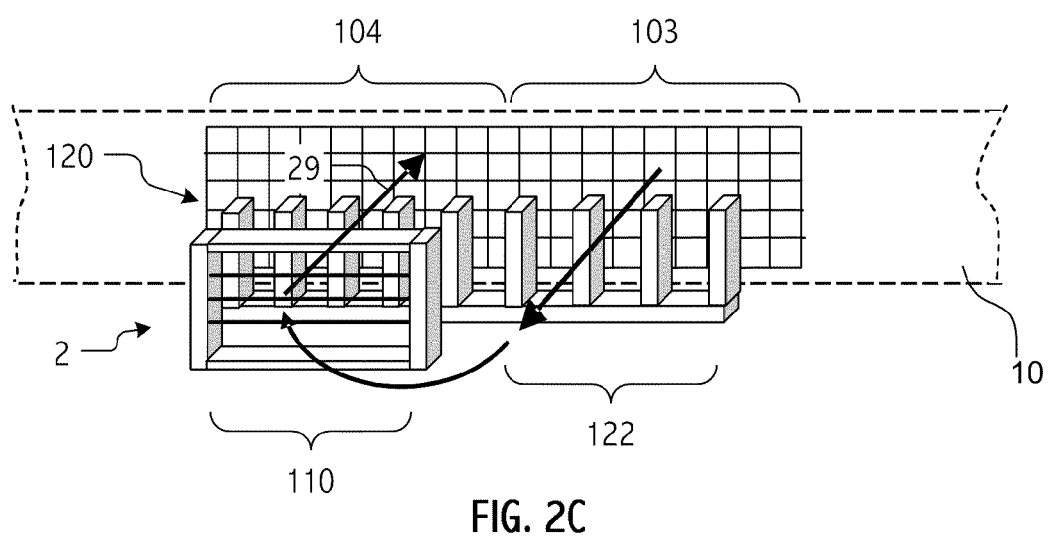
FIG. 2C depicts fluid flow relative to inlet and outlet portions of a ventilated boundary for an EHD device that establishes a corona discharge between corona discharge and collector electrodes of assemblies such as illustrated in FIGS. 2A and 2B.

FIG. 2C is a perspective view that illustrates fluid flow relative to inlet and outlet portions of a ventilated boundary for an EHD device that establishes a corona discharge between corona discharge and collector electrodes of assemblies such as illustrated in FIGS. 2A and 2B. The illustrated EHD device configuration provides a useful context in which to describe certain aspects of certain illustrative embodiments. As detailed herein, a wide variety of EHD device configurations may be employed and the particular configuration and component geometries depicted in the present illustration should not be taken as limiting.

As described above with reference to FIG. 1, when a high intensity electric field is established between corona discharge collector electrodes (here, corona discharge electrodes 110 and collector electrodes 120), air molecules near a corona discharge region become ionized and are accelerated in the electric field toward collector electrodes. Collisions with neutral molecules impart momentum, thereby inducing a corresponding movement of fluid molecules in a fluid flow direction.

Thus, in the illustration of FIG. 2C, flow 29 is induced by operation of the EHD device (EHD device 2) defined by placement of corona discharge electrodes 110 closely proximate to collector electrodes 120. In the illustrated embodiment, a partial surface 10 of an enclosure (e.g., a partial side or back side surface of a laptop computer enclosure) includes ventilated boundary portions 103 and 104 that respectively admit ambient air from outside the enclosure and allow air from inside the enclosure to exit. A generally "U" shaped flow path is illustrated. In the illustrated embodiment, both collector electrodes 120 and additional heat transfer surfaces 122 may be employed to transfer heat generated at a thermal source disposed in the interior of the enclosure to the air flow. Thermal pathways from the thermal source (e.g., from a processor or graphics unit) are omitted for simplicity of illustration.

Figure 3:
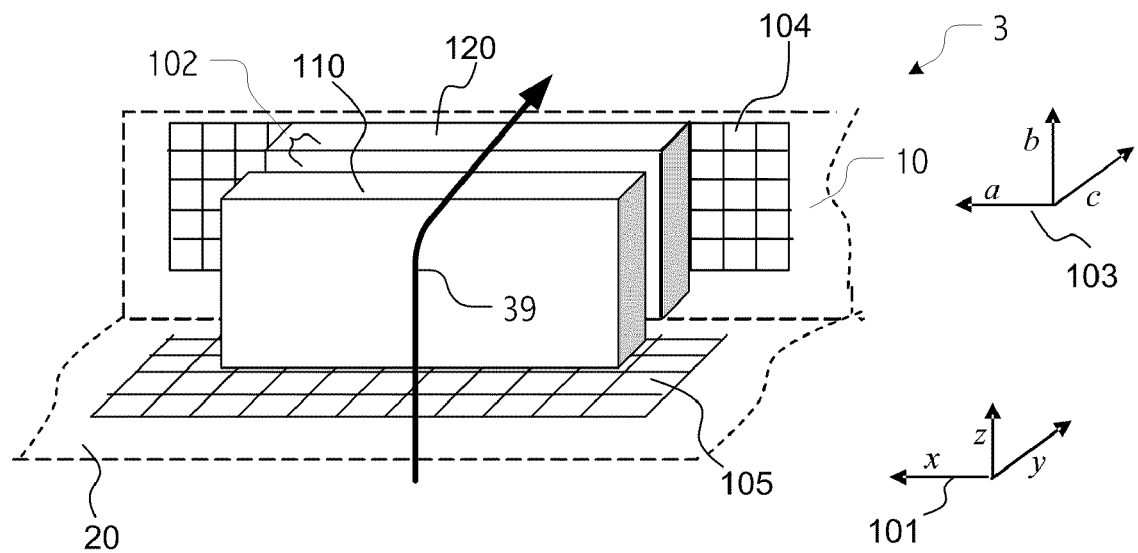
FIG. 3 depicts fluid flow relative to inlet and outlet portions of a ventilated boundary formed on adjacent surfaces of an enclosure for an EHD device that establishes a corona discharge between corona discharge and collector electrodes.
Figure 4:
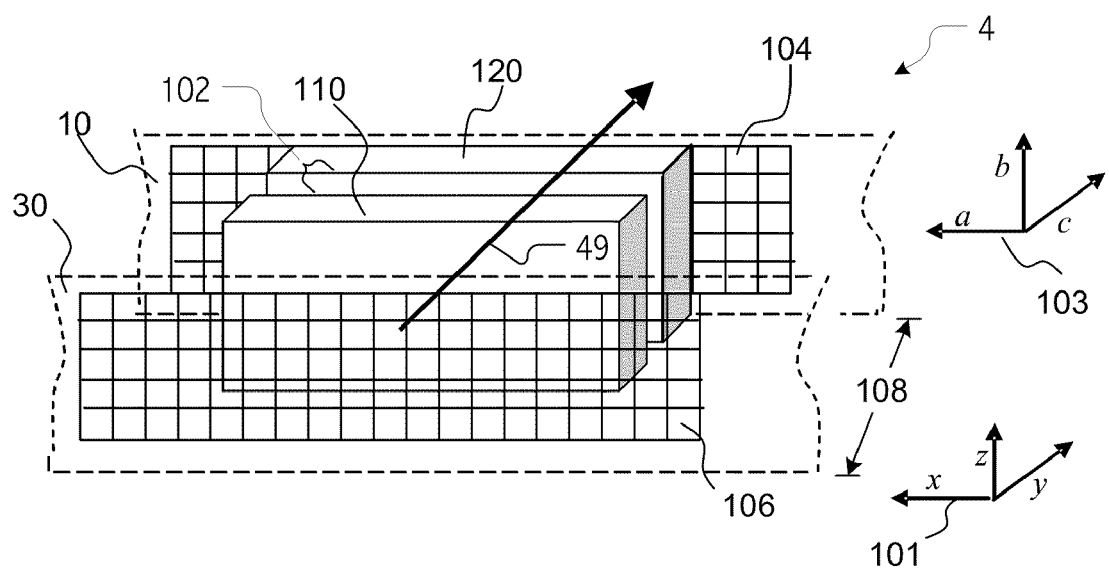
FIG. 4 depicts fluid flow relative to inlet and outlet portions of a ventilated boundary formed on opposing surfaces of an enclosure for an EHD device that establishes a corona discharge between corona discharge and collector electrodes.

FIGS. 3 and 4 illustrate ventilated boundary configurations in which air flow is motivated between respective portions of the ventilated boundary formed on different surfaces of an enclosure. For simplicity of illustration, corona discharge components and collector electrode components are each illustrated as a general volume separated by a small air gap 102 across which corona discharge voltages may be established. The generalized volumetric presentation of corona discharge and collector electrode components will be understood to be representative of various EHD device configurations, including the substantial range of alternative EHD device configurations and geometries specifically described and/or illustrated herein.

In particular, FIG. 3 is a perspective view of EHD device 3 illustrated as being positioned proximate to adjoining partial boundary surfaces 10 and 20 of an enclosure large enough to contain EHD device 3. Partial boundary surface 10 includes a ventilated portion 104, and partial boundary surface 20 includes a ventilated portion 105. When EHD device 3 is operational in this position within an enclosure, EHD forces generated in air gap 102 between one or more corona discharge electrodes 110 and collector electrodes 120 motivate the fluid in the direction of flow 39 through or over collector electrodes 120 to exit the enclosure through ventilated portion 104 of partial boundary surface 10. Fluid enters the enclosure through ventilated portion 105 of partial boundary surface 20 and is generally drawn in the direction of flow 39 toward corona discharge component 110. The position and configuration of EHD device 3 thus provides a relatively compact and short path for the flow of fluid through the enclosure.

In FIG. 3, EHD device 3 is situated in a three-dimensional coordinate system 101 in which the x-y plane respectively designates the width and depth of EHD device 3 and the z direction designates the height of EHD device 3. When coordinate system 101 also represents the coordinate system of the enclosure, boundary surface 10 may be a "side" of the enclosure and boundary surface 20 may be the "bottom" of the enclosure. A person of skill in the art will recognize that coordinate system 101 is only an exemplary representation of the position EHD device may occupy in the enclosure, and that EHD device 3 could be positioned as shown between any two adjoining boundary surfaces of the enclosure. So, for example, when the enclosure has a coordinate system 111 in which the c direction designates the height of the enclosure and the a-b plane designates the width and depth of the enclosure, respectively, when EHD device is situated in the enclosure according to coordinate system 111, boundary surface 10 would be considered to be the "top" of the enclosure and boundary surface 20 would be considered to be a "side" of the enclosure.

FIG. 4 is a perspective view of EHD device 4 illustrated as being positioned proximate to opposing partial boundary surfaces 10 and 30 of an enclosure large enough to contain EHD device 4. Partial boundary surface 10 includes a ventilated portion 104, and partial boundary surface 30 includes a ventilated portion 106. When EHD device 4 is operational in this position within an enclosure, EHD forces generated in air gap 102 between one or more corona discharge electrodes 110 and collector electrodes 120 motivate the fluid in the direction of flow 49 through or over collector electrodes 120 to exit the enclosure through ventilated portion 104 of partial boundary surface 10. Fluid enters the enclosure through ventilated portion 106 of partial boundary surface 30 and is generally drawn in the direction of flow 49 toward discharge electrodes 110. When the distance 108 between opposing partial boundary surfaces 10 and 30 of the enclosure is small, the position of EHD device 4 thus provides a relatively compact and short path for the flow of fluid through the enclosure.

When coordinate system 101 also represents the coordinate system of the enclosure, boundary surface 10 may be a first "side" of the enclosure and boundary surface 30 may be a second, opposing "side" of the enclosure. However, it is understood that, when the enclosure has a coordinate system 111 in which the c direction designates the height of the enclosure and the a-b plane designates the width and depth of the enclosure, respectively, when EHD device is situated in the enclosure according to coordinate system 111, boundary surface 10 would be considered to be the "top" of the enclosure and boundary surface 30 would be considered to be a "bottom" of the enclosure.

Illustrative EHD Device Variations

Although EHD device configurations are simplified for some depictions and descriptions herein to emphasize other aspects (particularly flows and placements with respect to ventilated boundary portions of an enclosure), it should be understood that a broad range of EHD design variations is envisioned. To this end, several more detailed illustrations of EHD device configurations follow. Based on the illustrations and descriptions thereof, persons of ordinary skill in the art will appreciate a range of EHD device variations suitable for inclusion as corona discharge electrode and collector electrode assemblies illustrated more generally herein.

Figure 5:
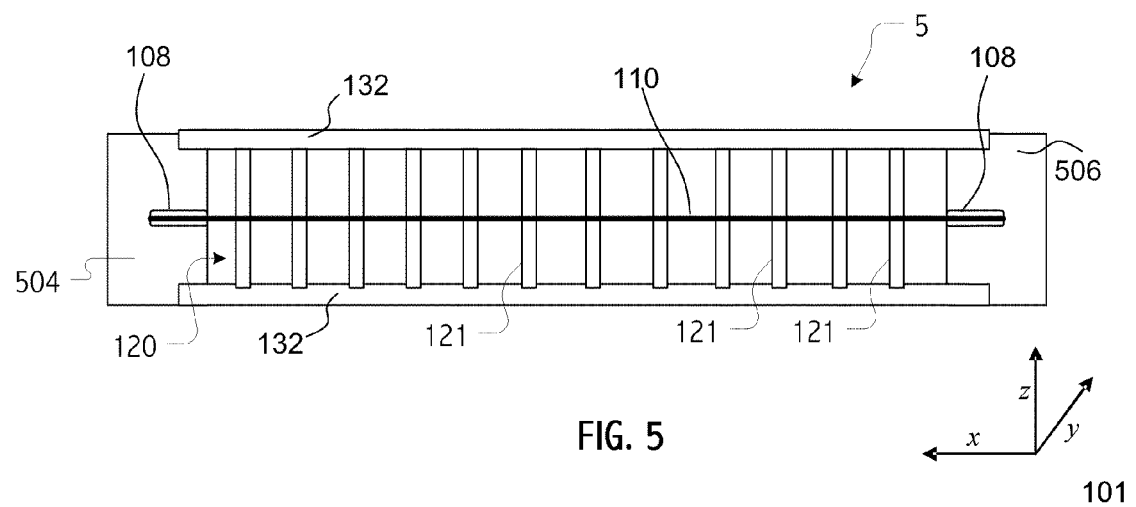
FIGS. 5, 6 and 7 depict several illustrative end-on views of EHD device configurations in which one or more corona discharge electrodes have longitudinal extent that is oriented orthogonally to respective generally planar surfaces of collector electrodes.
Figure 6:
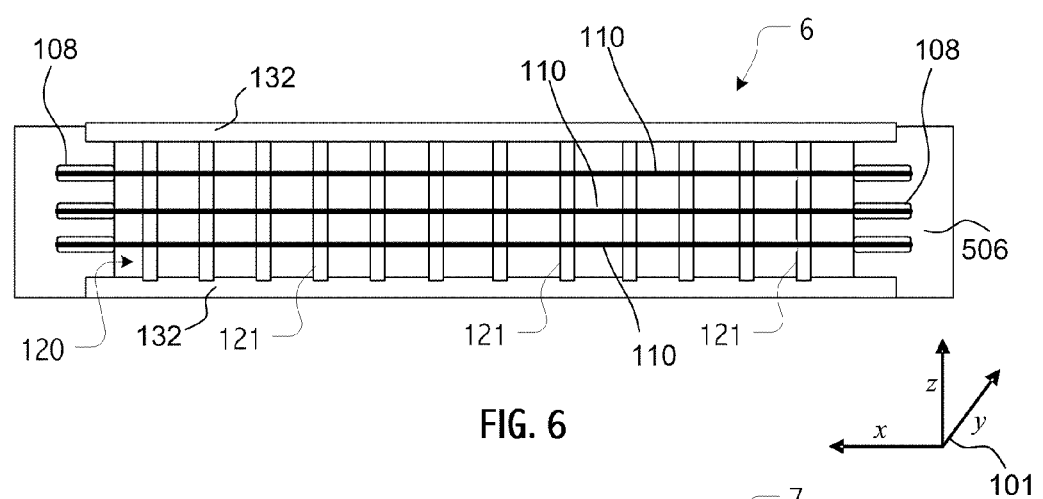
Figure 7:
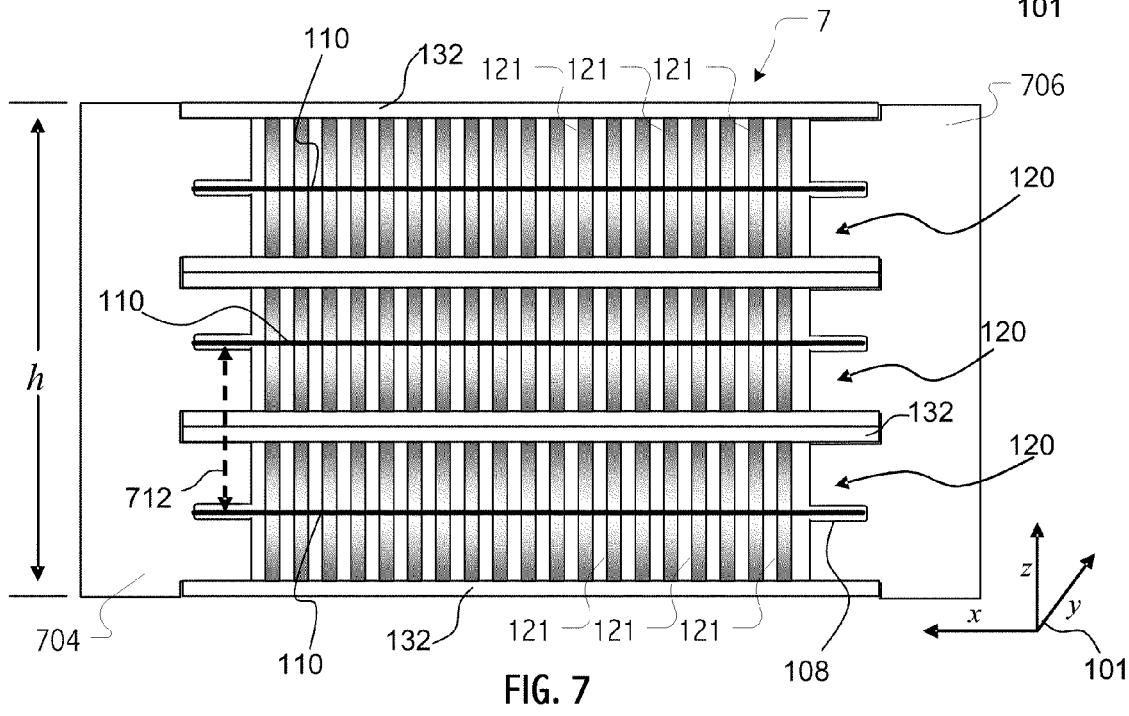

FIGS. 5, 6 and 7 depict several illustrative end-on views of EHD device configurations in which one or more corona discharge electrodes have longitudinal extent that is oriented orthogonally to respective generally planar surfaces of collector electrodes. FIG. 5 depicts an illustrative single corona electrode configuration. FIG. 6 depicts an illustrative multiple corona electrode configuration. FIG. 7 depicts an illustrative ganged configuration.

More specifically, FIG. 5 is a front, side view of an EHD device in accordance with some embodiments of the present invention. EHD device 5 will be understood relative to a three-dimensional coordinate system 101 in which the x-y plane respectively designates the width and depth of device 5 and the z direction (into the page) designates the height, h, of device 5. In FIG. 5, device 5 motivates flow of a fluid in the y direction; that is, fluid is drawn into a first, or front, surface of device 5 shown in FIG. 5 and typically exits a surface, opposite the first surface, not shown in FIG. 5.

In the configuration illustrated, EHD device 5 includes first and second opposing frame members 504 and 506 that function to hold, or support, corona discharge electrode 110 and collector electrode array 120. Frame members 504 and 506 may be fabricated of a dielectric material in order to provide electrical isolation from other components of EHD device 5. Corona discharge electrode 110 in EHD device 5 has a small radius of curvature and, in some embodiments, may take the form of a wire or rod. Other shapes for corona discharge electrode 110 are also possible; for example, corona discharge electrode 110 may take the shape of barbed wire, a band, blade or place that, in some embodiments, may present a knife- or serrated-edge. In some embodiments, a cross-section such as illustrated in FIG. 1 for electrode 10 may be employed. Typically, a small radius of curvature or sharp point tends to facilitate ion production at an appropriate point when high voltage is applied.

In general, corona discharge electrode 110 may be fabricated in a wide range of materials. For example, in some embodiments, compositions such as described in U.S. Pat. No. 7,157,704, filed Dec. 2, 2003, entitled "Corona Discharge Electrode and Method of Operating the Same" and naming Krichtafovitch et al. as inventors may be employed. U.S. Pat. No. 7,157,704 is incorporated herein for the limited purpose of describing materials for some corona discharge electrodes that may be employed in some embodiments. In general, a high voltage power supply (not specifically shown) creates the electric field between corona discharge electrode 110 and collector electrode array 120.

In the embodiment of FIG. 5, frame members 504 and 506 include a pair of curved recesses 108, generally conformal with an end portion of corona discharge electrode 110. Each opposing end of corona discharge electrode 110 passes through a respective recess 108 and is attached to an interior portion (not shown) of a respective frame member. Recess 108 provides a transition region for corona discharge electrode 110 to pass through from its positioning proximate to collector electrode array 120 and one of frame members 504 and 506. The transition region eliminates the sharp points that may occur at an abrupt junction between corona discharge electrode 110 and its respective frame member, thereby reducing arcing and other undesirable effects in the surrounding high electric field created during operation of EHD device 5.

With continued reference to FIG. 5, collector electrode array 120 includes a plurality of substantially parallel unit structures 121 attached to a pair of parallel and substantially flat, spaced apart support members 132. Each unit structure 121 functions as a collector electrode and may generally have greater depth (in the y direction) than width (in the x direction). Unit structures 121 may be fabricated of any suitable metal material, such as aluminum or copper. The number of, and distance between, unit structures 121 in collector array 120 may vary according to device specifications. Unit structures 121 are generally planar and, in some embodiments, present a curved leading surface exposed toward corona discharge electrode 110. In some embodiments, unit structures 121 include a generally rectangular extent in the direction of fluid flow (the y direction), although, more generally, may be formed in other shapes.

FIG. 6 depicts an illustrative multiple corona electrode configuration of EHD device 6 akin to that just described. Multiple corona discharge electrodes 110 are included. Unit structures 121 of collector electrode array 120 are generally planar and present a leading surface exposed toward corona discharge electrodes 110.

FIG. 7 is a side view of an EHD device configuration in which multiple assemblies are ganged to increase total volume of fluid flow. A first, or front, surface of EHD device 7 is situated in a three-dimensional coordinate system 101 in which the x-y plane respectively designates the width and depth of EHD device 7 and the z direction designates the height, h, of EHD device 7. As before, EHD device 7 motivates flow of a fluid in the y direction; that is, fluid is drawn into the first, or front, surface of EHD device 7 and exits a rear surface, opposite the first surface.

EHD device 7 includes a plurality of corona discharge electrodes and associated collector electrode arrays of the type described with respect to EHD device 5 of FIG. 5, assembled in a single housing or frame. The presentation in FIG. 5 of EHD device 7 as having three EHD device assemblies is solely for the sake of illustration, and is not intended to be limiting in any way. EHD device 7 includes opposing frame members that function to hold, or support, corona discharge electrodes 110 and associated collector electrode arrays 120. Each frame member includes a plurality of recesses 108 as previously described.

In one exemplary implementation of EHD device 7, frame sections 704 and 706 may have a height, h, of approximately 9 mm, and a distance 712 between adjacent corona discharge electrodes 110 may be approximately 4 mm. In some embodiments, unit structures 121 present a curved leading surface exposed toward respected corona discharge electrodes 110.

FIG. 8A depicts a simplified perspective view, consistent with certain of the preceding EHD device configurations, of a corona discharge electrode and several orthogonally-oriented generally planar collector electrodes with curved leading surface profiles. FIG. 8B depicts a side cross-sectional view consistent with FIG. 8A. FIG. 8C depicts a side cross-sectional view for an alternative collector electrode geometry.

More specifically, FIG. 8A illustrates several adjacent unit structures 121 of collector electrode array 120. For simplicity of description (and generality with respect to alternative EHD device configurations), such unit structures 121 are hereafter referred to as collector electrodes 120, although persons of ordinary skill in the art will immediately recognize that, in some configurations, additional structures (such as support members 132) may be electrically conductive and act as part of an overall "collector electrode." In view of the foregoing, we now turn to the leading surface(s) 136 of collector electrodes 121.

Fluid flow through collector electrode array 120 is generally in the direction of flow 89. In the embodiment shown in FIG. 8A, collector electrodes 121 are substantially rectangular in shape, having a leading edge disposed closest to corona discharge electrode 110 and a trailing edge opposite to leading edge 138. The leading edge includes a contoured or curved surface 136. As will be understood by persons of ordinary skill in the art, consistent with principles of high voltage design, curved leading surface 136 is intended to present generally curvaceous surface contours toward corona discharge electrode 110 and any sharp exposed edges are merely an artifact of the illustration and cross section of FIG. 8A. Corona electrode 110 is shown positioned a distance, d, above collector electrodes 121. Distance d may sometimes be referred to as the "gas gap" or "air gap."

The illustrated EHD device may be constructed in a variety of sizes, and thus is suitable for a variety of thermal management applications involving the cooling of electronic circuits. In one exemplary implementation, corona discharge electrode 110 may be a bare or coated tungsten wire having a diameter of about 12.5 μm; collector electrodes 121 of collector array 120 have a height of approximately 3 mm, a width (thickness) of about 0.25 mm and are spaced approximately 3 mm apart on center; and the distance, d, between corona discharge electrode 110 and collector electrodes 121 is approximately 1.6 mm. The voltage applied across the air gap between corona discharge electrode 110 and collector electrodes 121 may be in the range of 1.5 kV to 4 kV.

FIG. 8B is a simplified cross-sectional view of corona discharge electrode 110 and a single collector electrode 121 instance in accord with the curved leading surface profiles illustrated FIG. 8A. In particular, FIG. 8B illustrates a side view of collector electrode 121. In operation, when an electric field is created between corona discharge electrode 110 and collector electrode 121, ions generally flow in the directions of the electric field lines. Curved leading surface 136 may provide certain enhancements to the operation of EHD device 100. For example, utilizing a generally curved leading surface 136 for instances of collector electrode 120 may allow for a shorter distance, d, between corona electrode 110 and collector electrode 121, while at the same time increasing ion production and assisting in preventing sparks and arcing. In addition, utilizing curved surface 136 for collector electrode 121 may provide electrical separation between adjacent corona discharge electrodes in some embodiment described elsewhere herein that gang multiple EHD device instances.

FIG. 8C is a simplified cross-sectional view of corona discharge electrode 110 and a single collector electrode 121 instance in accord with an alternative leading surface profile. In some embodiments, such as that illustrated in FIG. 6, multiple corona discharge electrodes 110 may be provided.

Figure 9A:
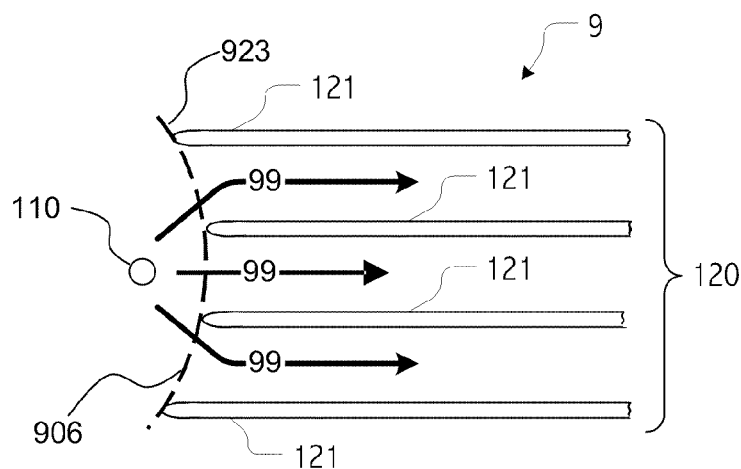
FIG. 9A depicts a side cross-sectional view, consistent with certain alternative EHD device configurations, of a corona discharge electrode and several generally planar collector electrodes that are arranged to present a curved array of leading surfaces, where each of the leading surfaces is oriented generally parallel to the longitudinal extent of the corona discharge electrode.
Figure 9B:
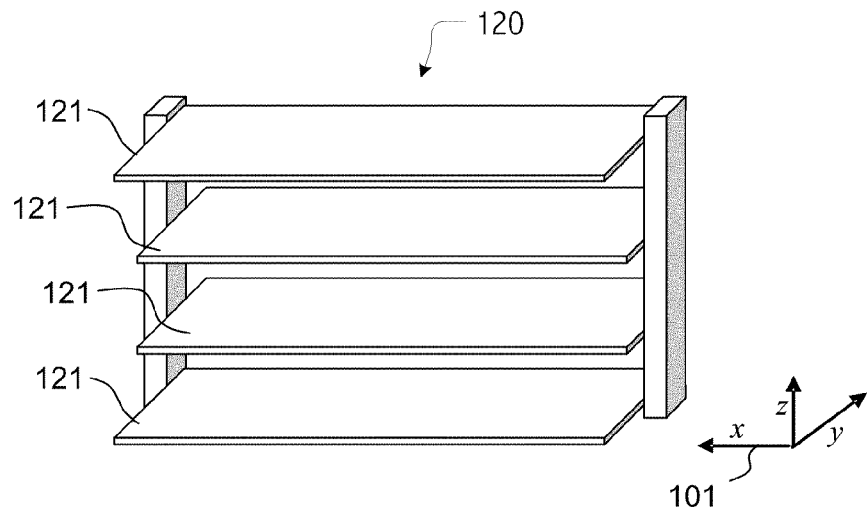
FIG. 9B depicts a perspective view of a collector electrode assembly consistent with the arrangement of FIG. 9A.
Figure 9C:
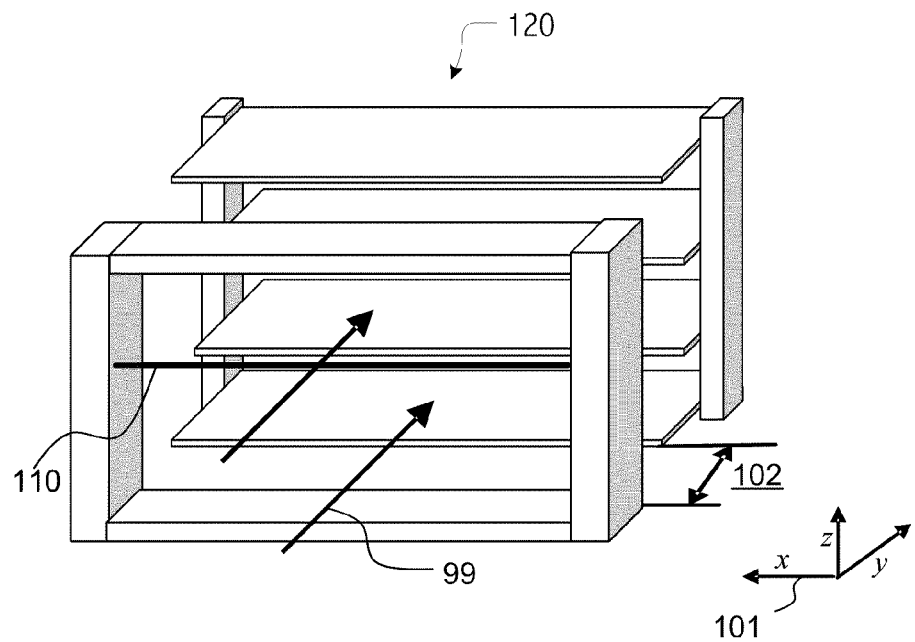
FIG. 9C depicts a perspective view of a corona discharge electrode and collector electrode assemblies consistent with the arrangement.

FIG. 9A depicts a side cross-sectional view, consistent with certain alternative EHD device configurations, of a corona discharge electrode and several generally planar collector electrodes that are arranged to present a curved array of leading surfaces, where each of the leading surfaces is oriented generally parallel to the longitudinal extent of the corona discharge electrode. FIG. 9B depicts a perspective view of a collector electrode assembly consistent with the arrangement of FIG. 9A. FIG. 9C depicts perspective view of a corona discharge electrode and collector electrode assemblies consistent with the arrangement. Note that perspective views are situated in a three-dimensional coordinate system 101 (FIGS. 9B and 9C) in which the x-y plane respectively designates width and depth of the illustrated EHD device. Flow 99 is in generally the y direction and the z direction indicates the height of the device.

Referring to FIG. 9A, EHD device 9 includes an array 120 of collector electrodes 121. Collector electrodes disposed between top and bottom collector electrodes are recessed away from corona discharge electrode 110 in a manner such that the leading surfaces thereof form a curved leading surface array 906. When EHD device 9 is operational, the EHD forces generated between corona discharge electrode 110 and collector electrode array 120 motivate fluid in the direction of flows 99 between the collector electrodes. FIG. 9B is a front perspective view of collector electrode array 120 of FIG. 9A showing individual collector electrodes 121 attached to support members. FIG. 9C is a front perspective view of EHD device 9 showing corona discharge electrode 110 supported by a frame positioning corona discharge electrode 110 a distance 102 from collector electrode array 120, and illustrating the fluid flow direction produced when EHD device 9 is operational.

Assemblies for corona discharge electrode 110 and for collector electrode array 120 are shown as discrete structures purely for purposes of illustration relative to the more general depictions that follow. As before, persons of ordinary skill in the art will recognize that EHD device 9 may be constructed using a unitary dielectric support structure. Also, while a single corona discharge electrode and generally curved arrangement of collector electrode leading surfaces is illustrated, persons of ordinary skill in the art will appreciate (based on the description herein) that multiple corona electrode variations, and variations in which other (e.g., uncurved) arrangements of leading surfaces present, may be provided in other embodiments.

Flow Paths

Each of the EHD device embodiments described herein includes at least one corona discharge electrode. As previously explained, corona discharge electrodes generally have a small radius of curvature and may take the form of a wire or rod or edge. Other shapes for the corona discharge electrode are also possible; for example, the corona discharge electrode may take the shape of barbed wire, wide metallic strips, and serrated plates or non-serrated plates having sharp or thin parts that facilitate ion production at the portion of the electrode with a high radius of curvature when high voltage is applied. Corona discharge electrodes may be fabricated in a wide range of materials Likewise, each of the EHD device embodiments described herein includes at least one collector electrode. In general, collector electrodes may be fabricated of any suitable metal material, such as aluminum or copper, and may have the shape of a bar or plate. Collector electrodes (referred to therein as "accelerating" electrodes) may be formed in aerodynamically "friendly" shapes that provide a low coefficient of drag for the fluid (air) in the range of 0.01 to no greater than 1. Furthermore, as known in the art, collector electrodes may be fabricated with high resistivity material (often as a coating) that acts to quench arcing. Examples of such relatively high resistance materials include carbon filled plastic, silicon, gallium arsenide, indium phosphide, boron nitride, silicon carbide, and cadmium selenide. Typically, many of the EHD devices described and illustrated herein will comprise an array of collector electrodes. The number of, and distance between, the collector electrodes, and the shape of the collector electrodes comprising a collector electrode array may vary according to device specifications and the type of fluid being moved.

In order to simplify description of flows illustrated in FIGS. 10A-18 that follow, one or more corona discharge electrodes of any suitable design or configuration are illustrated simply as corona discharge electrode component 110. Likewise, one or more collector electrodes of any suitable design or configuration are illustrated simply as collector electrode component 120. In general, the distance between a corona discharge electrode and a collector electrode is referred to as the "gap" or "air gap" and is determined by the particular shapes of the corona discharge electrode(s) and the collector electrode(s). Such gaps are illustrated (at a high-level) as air gap 102 in the some of simplified flow illustrations of FIGS. 10A-18. Finally, although terminals of a high voltage power supply are typically electrically connected to and create the electric field between corona discharge and collector electrodes which in turn generates an ion stream that accelerates ambient fluid toward the collector electrode, power supply connections are omitted for simplicity.

Several of the embodiments of the EHD devices described herein are illustrated as being proximate to a single boundary surface, or single partial boundary surface (see, for example, partial boundary surface 10 in FIG. 1) that forms one of the boundary sides, top or bottom of an enclosure (e.g., housing or container or case) large enough to contain the EHD device. The boundary surface of the enclosure has at least one ventilated portion (for example, ventilated portion 104 in FIG. 10A) that both admits fluid from outside into the enclosure and allows for fluid inside the enclosure to exit. Each such embodiment is illustrated to show the path of fluid flow into and out of the enclosure through the single boundary surface when the EHD device is operational, and is thus described below as producing a "single-surface fluid flow path" into and out of the enclosure that contains the device. Each of the embodiments of an EHD device illustrated herein that is illustrated to show a single-surface fluid flow path is preferably housed in an enclosure in which the single boundary surface is the predominant boundary surface of the enclosure that is ventilated to permit a fluid to enter or exit the enclosure. However, this is not a requirement for implementing these EHD device embodiments; the enclosure that contains the device may have more than one ventilated boundary surface to permit a fluid to enter or exit the enclosure. Moreover, the single ventilated boundary surface is not limited to being a flat or linear surface as illustrated in several of the figures; it may be a curved surface with sufficient curvature to surround the EHD device such that fluid is drawn in from one portion of the curved boundary surface and is forced out of the enclosure by the operation of the EHD device through another portion of the curved boundary surface.

Several other embodiments of EHD devices described herein are illustrated as being proximate to at least two boundary surfaces, or partial boundary surfaces (for example, partial boundary surfaces 104 and 105 in FIG. 10) of an enclosure large enough to contain the EHD device. Each of the at least two boundary surfaces of the enclosure has a ventilated portion that both admits ambient air from outside into the enclosure and allows for air inside the enclosure to exit. The figures that illustrate these embodiments show the path of fluid flow that is created when the EHD device is operational into and out of the enclosure through the at least two boundary surfaces.

While not illustrated and described herein, it is understood that any one of the embodiments of the EHD devices described herein may be implemented in a plural configuration in which two or more individual EHD devices of the type described herein are sequentially disposed relative to a desired fluid flow direction. Each individual EHD device is then referred to as a stage, and the entire configuration is referred to as a multi-stage EHD device. In operation, each individual EHD device stage may be operated simultaneously and synchronously with the others in order to produce increased volume and pressure of fluid flow in the desired direction, thereby sequentially accelerating a fluid through the multiple stages. Synchronous operation of a multi-stage EHD device is defined herein to mean that a single power supply, or multiple synchronized and phase-controlled power supplies, provide high voltage power to each EHD device stage such that both the phase and amplitude of the electric power applied to the same type of electrodes in each stage (i.e., the corona discharge electrodes or the collector electrodes) are aligned in time. U.S. Pat. No. 6,727,657, entitled "Electrostatic Fluid Accelerator for and a Method of Controlling a Fluid Flow" provides a discussion of the configuration and operation of several embodiments of a multi-stage EHD device, including computing an effective inter-stage distance and exemplary designs for a high voltage power supply for powering neighboring EHD device stages with respective synchronous and syn-phased voltages. U.S. Pat. No. 6,727,657 is incorporated by reference herein in its entirety for all that it teaches.

The EHD devices described and illustrated herein may be operated to dissipate heat generated by a thermal source disposed in the enclosure using principles of forced convective heat transfer. Forced convective heat transfer is a mechanism of heat transfer in which the movement of the fluid that dissipates the heat is induced by an external source such as a pump or fan or an EHD device of the type described herein. The ability to attain efficient heat dissipation depends in part on both the volumetric flow rate and the velocity of the air flow that can be achieved by the fluid movement source, as well as on the total surface area of the convective surfaces from which the heat is transferred. Improvements in heat dissipation efficiency of a thermal management solution may be achieved, in part, by design choices that (1) minimize fluid flow resistance caused by obstacles and flow restrictions in the path of the fluid flow, (2) minimize the length of the path through which the fluid flows as it is forced over or around the heated convective surfaces, (3) maximize the total surface area of the convective surfaces from which the heat is transferred, and (4) minimize the speed of fluids in the system while maintaining a desired, or target, fluid flow rate. The embodiments of the EHD devices described herein achieve improvements in heat dissipation efficiency using one or more of these three design choices, alone or in combination.

When an embodiment of an EHD device illustrated herein is used to dissipate heat from a thermal source, it may be part of a thermal management system that may further comprise one or more additional elements that efficiently transports heat generated by the thermal source to the collector electrode component of the EHD device, thereby heating the collector electrode component. The operational EHD device causes a substantial amount of the fluid entering the enclosure to generally follow the fluid flow path shown by the arrows in each figure through or over the heated collector electrode component to exit the enclosure, thereby dissipating heat accumulating in the air above and in the vicinity of the EHD device, and in particular, the collector electrode component.

Fluid Flow Paths Involving Ventilated Portions of a Single Boundary Surface

Figure 10A:
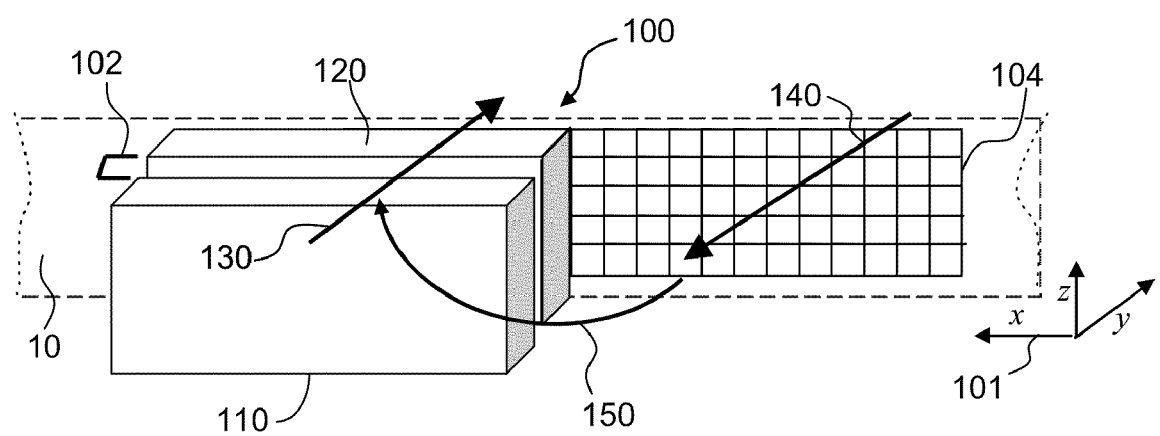
FIG. 10A is a perspective view of a first EHD device configuration illustrating a generally "U" shaped fluid flow path between inlet and outlet portions of a ventilated boundary surface.

FIG. 10A is a perspective view that illustrates flows relative to an EHD device 100 situated in a three-dimensional coordinate system 101 in which the x-y plane respectively designates the width and depth of device 100 and the z direction designates the height of device 100. EHD device 100 comprises corona discharge component 110 and collector electrode component 120. These components are shown as generally rectangular structures for purposes of illustration only, and their relative sizes and shapes in FIG. 10A are not intended to convey any specific relationships between the two components. Corona discharge component 110 includes at least one corona discharge electrode, and collector electrode component 120 includes at least one collector electrode, neither of which is individually shown in FIG. 10A. EHD device 100 is illustrated as being positioned proximate to partial boundary surface 10 of an enclosure large enough to contain EHD device 100. Partial boundary surface 10 includes a ventilated portion 104.

In the embodiment of FIG. 10A, when EHD device 100 is operational, a substantial amount of the fluid entering the enclosure through a first portion of partial boundary surface 10 is drawn generally in the direction of arrow 140 and follows air flow path 150 toward corona discharge component 110 of EHD device 100. The EHD forces generated in air gap 102 between corona discharge component 110 and collector electrode component 120 force fluid in the direction of arrow 130 through or over collector electrode component 120 to exit the enclosure through a second portion of partial boundary surface 10. The configuration of EHD device 100 thus provides a relatively compact and short "U" shaped path, as defined by arrow 140, arrow 150 and arrow 130, for the flow of fluid through the enclosure.

Figure 11A:
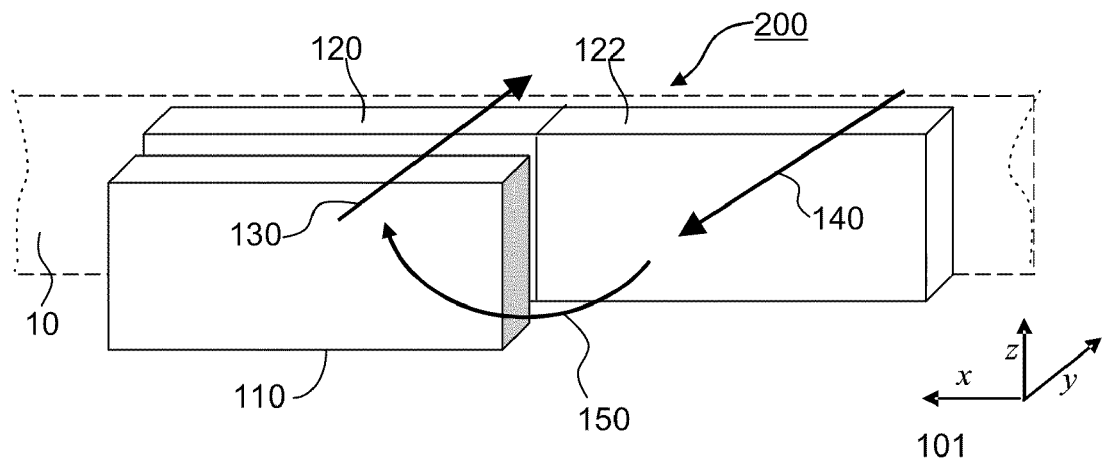
FIG. 11A is a perspective view of a second EHD device configuration in which additional heat transfer surfaces are provided and illustrating a generally "U" shaped fluid flow path between inlet and outlet portions of a ventilated boundary surface.

FIG. 11A is a perspective view that illustrates flows relative to an EHD device 200 which is a variation of EHD device 100 (previously described) in which both collector electrode component 120 and additional heat transfer surfaces 122 are employed to transfer heat to the fluid flow. In some embodiments in accord with FIG. 11A, additional heat transfer surfaces 122 are an electrically and thermal conductive extension of collector electrode component 120 whose surfaces are not sufficiently proximate to a corona discharge electrode to contribute to EHD motivated fluid flow. In some embodiments, heat transfer surfaces 122 are structurally distinct from collector electrode component 120, though each is coupled into a heat transfer pathway. In some embodiments, heat transfer surfaces 122 may be the dominant heat transfer surfaces. As before, partial boundary surface 10 has a ventilated portion (not specifically shown in FIG. 11A) that permits a fluid to flow into and out of the enclosure. Fluid flow follows the same path as illustrated in FIG. 10A, except that the fluid passes through or over additional heat transfer surfaces 122.

In some embodiments, heat transfer surfaces of EHD device 100 (and of other EHD devices described herein) whether operating as collector electrodes or otherwise are at least partially coated with ozone reducing catalyst material. Although a variety of ozone reducing catalysts may be employed, for collector electrode surfaces a generally nonconductive catalyst may be preferred. U.S. Pat. No. 6,603,268 to Lee, entitled "Method and Apparatus for Reducing Ozone Output from an Ion Wind Device" described catalyst materials (including certain manganese dioxide coatings) suitable for use in some embodiments and is incorporated herein by reference.

Figure 12A:
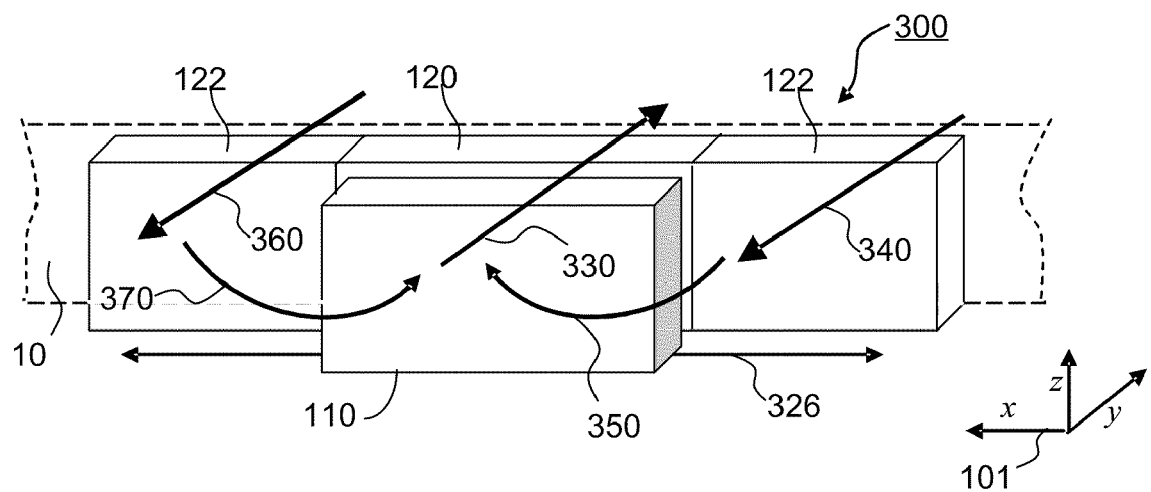
FIG. 12A is a perspective view of an EHD device configuration in which additional heat transfer surfaces are provided and illustrating a comingled pair of generally "U" shaped fluid flow path between plural inlet portions and a single outlet portion of a ventilated boundary surface.

FIG. 12A is a perspective view that illustrates flows relative to an EHD device 300 which is a further variation of EHD device 200 (previously described) in which both collector electrode component 120 and additional heat transfer surfaces 122 are employed to transfer heat to the fluid flow. As before, in some embodiments, both collector electrode component 120 and additional heat transfer surfaces 122 are employed to transfer heat to the fluid flow and partial boundary surface 10 has a ventilated portion (not specifically shown in FIG. 12A) that permits a fluid to flow into and out of the enclosure. The configuration of EHD device 300 provides two paths for fluid flow through the electronic apparatus: the first is defined by the combination of the arrow 340, arrow 350 and arrow 330, and the second is defined by the combination of the arrow 360, arrow 370 and arrow 330.

In some embodiments in accord with FIG. 12A, additional heat transfer surfaces 122 are implemented as electrically and thermally conductive extensions of collector electrode component 120 whose surfaces are not sufficiently proximate to a corona discharge electrode to contribute to EHD motivated fluid flow. In such embodiments, corona discharge component 110 may be positioned at various points along the illustrated x-axis 326 such that portions sufficiently proximate to corona discharge electrodes constitute the collector electrode array 122 and remaining portions constitute the additional heat transfer surfaces 122. In some embodiments, additional heat transfer surfaces 122 are structurally distinct from collector electrode component 120, though each is coupled into a heat transfer pathway. In some embodiments, heat transfer surfaces 122 may be the dominant heat transfer surfaces.

FIGS. 10B, 11B-D, 12B and 13-19 are top plan views of various embodiments of EHD devices situated in a three-dimensional coordinate system 103 in which the x-y plane respectively designates the width and depth of the embodiment of the EHD device illustrated in the respective figure. The z direction indicates the height of the device.

Figure 10B:
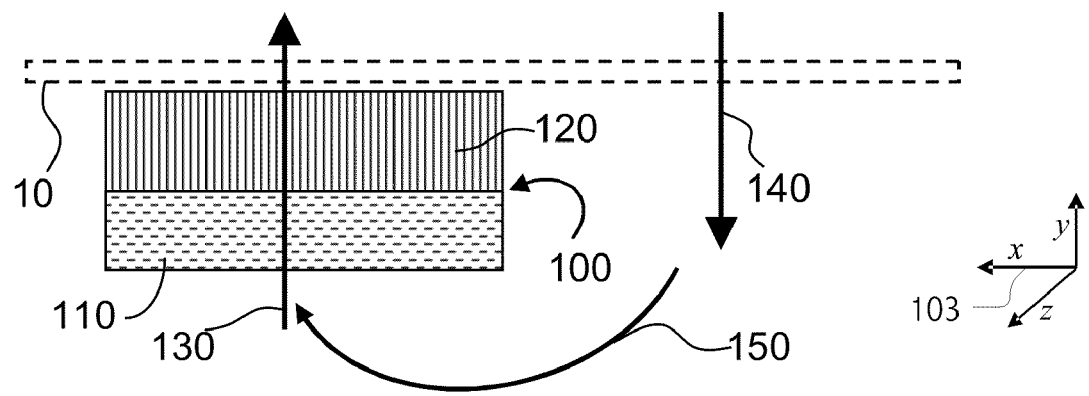
FIG. 10B is a corresponding plan view illustration.
Figure 11B:
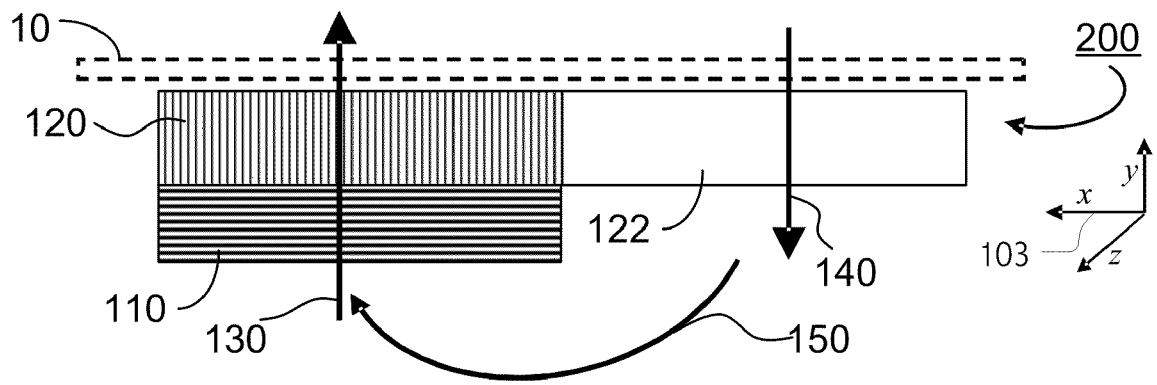
FIG. 11B is a corresponding plan view illustration.
Figure 12B:
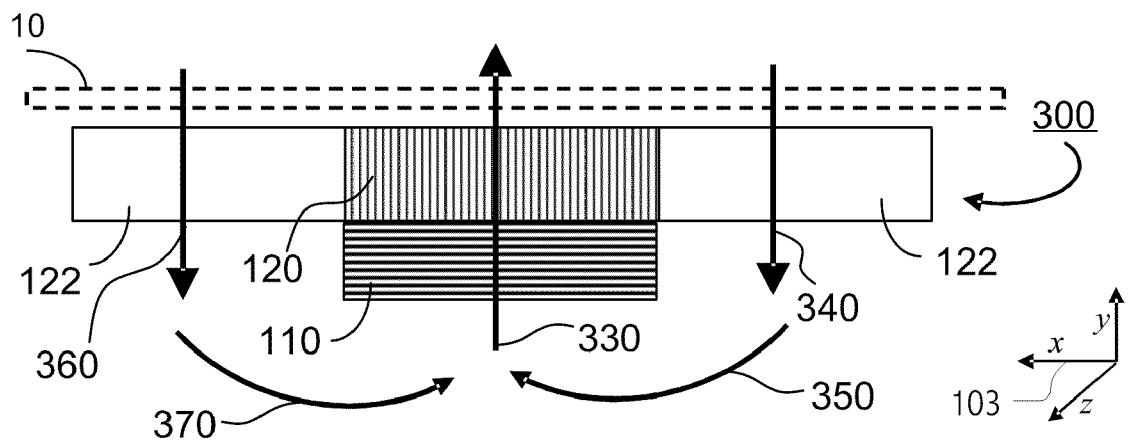
FIG. 12B is a corresponding plan view illustration.

FIG. 10B is a top plan view of EHD device 100 of FIG. 10A, showing EHD device 100 positioned proximate to partial boundary surface 10 of an enclosure that houses EHD device 100, and further showing the fluid flow path defined by arrows 140, 150 and 130 into and out of the enclosure when EHD device is operational. Similarly, FIG. 11B shows a top plan view of EHD device 200 and FIG. 12B shows a top plan view of EHD device 300.

Figure 11C:
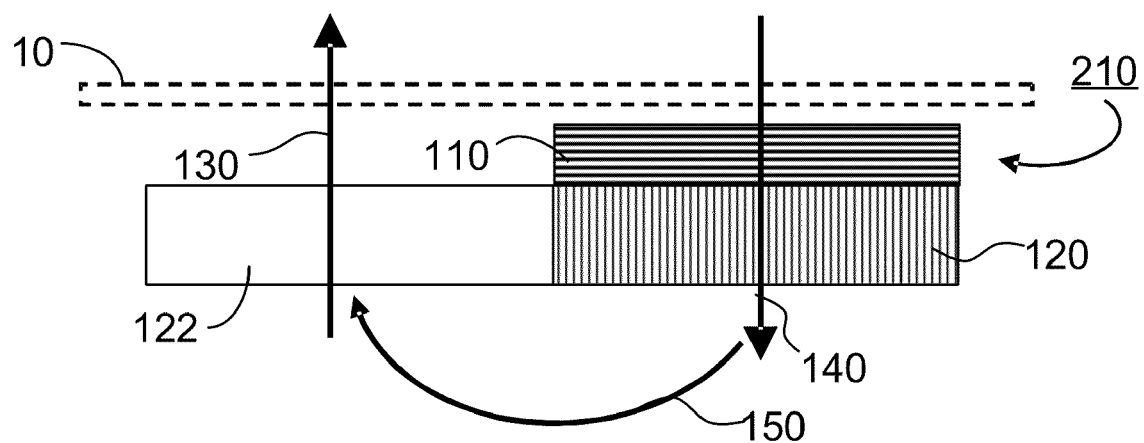
FIG. 11C is a plan view illustration for an alternative configuration in which flow ordering over collector electrodes and additional heat transfer surfaces is reversed.

FIG. 11C shows a top plan view of a variation on EHD device 200 in which corona discharge component 110 and collector electrode component 120 are oriented to motivate flow into (rather that out of) the enclosure through partial boundary surface 10. The illustrated EHD device 210 provides the same relatively compact and short path, as defined by arrow 140, arrow 150 and arrow 130, for the flow of fluid through the enclosure as provided by the EHD devices of FIGS. 10A, 10B, 11A and 11B, but achieves fluid flow in a different manner. In the illustration of FIG. 11C, when EHD device 210 is operational, the high voltage power supply (not shown) energizes corona discharge component 110 and collector electrode component 220 so as to generate EHD forces in the direction of arrow 140, thereby pulling fluid from outside of the enclosure through an inlet portion of ventilated partial side boundary 10 into the enclosure and then along the fluid flow path defined by arrows 150 and 130 over or through additional heat transfer surfaces 122 to exit the enclosure through an outlet portion of ventilated partial side boundary 10.

Figure 11D:
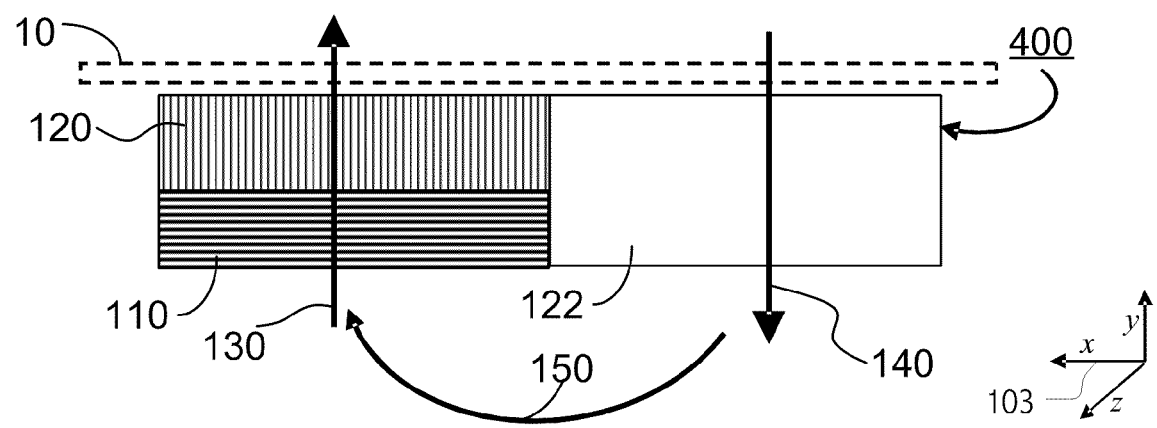
FIG. 11D is a plan view illustration of a further alternative configuration in which additional heat transfer surfaces are extended.

FIG. 11D shows a top plan view of another variation on EHD device 200 (illustrated as EHD device 400) in which additional heat transfer surfaces 122 are extended in the y-axis direction to facilitate greater transfer heat to the fluid flow. As before, additional heat transfer surfaces 122 may be an electrically and thermal conductive extension of collector electrode component 120 whose surfaces are not sufficiently proximate to a corona discharge electrode to contribute to EHD motivated fluid flow or, in some embodiments, heat transfer surfaces 122 may be structurally distinct from collector electrode component 120.

Figure 11E:
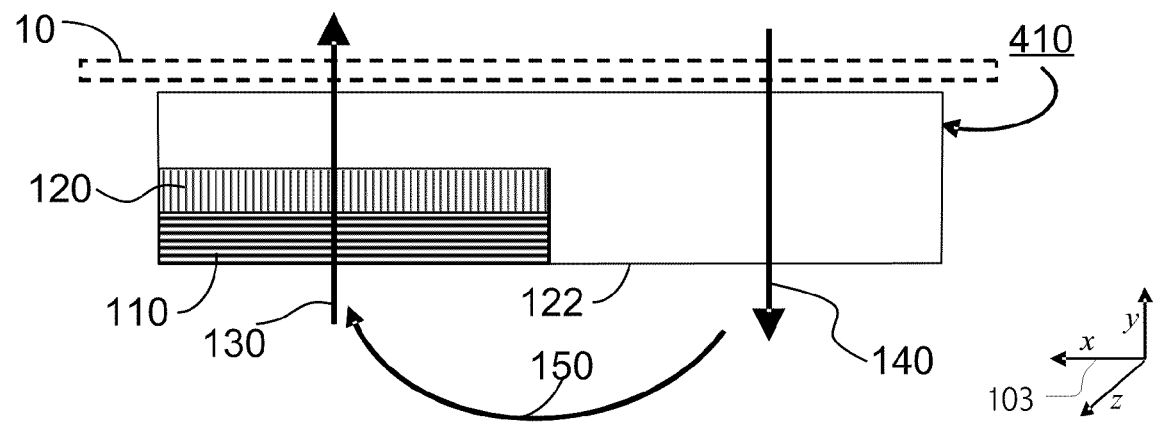
FIG. 11E shows a top plan view of still another alternative configuration.

FIG. 11E shows a top plan view of still another variation on EHD device 200 (illustrated as EHD device 410) in which heat transfer surfaces 122 are extended such that fluid flow motivated by corona discharge between one or more electrodes of corona discharge component 110 and collector electrodes of collector electrode component 120 motivates fluid flow over heat transfer surfaces 122. In some embodiments, heat transfer surfaces 122 may be structurally distinct, though appurtenant to, collector electrode component 120.

Figure 13:
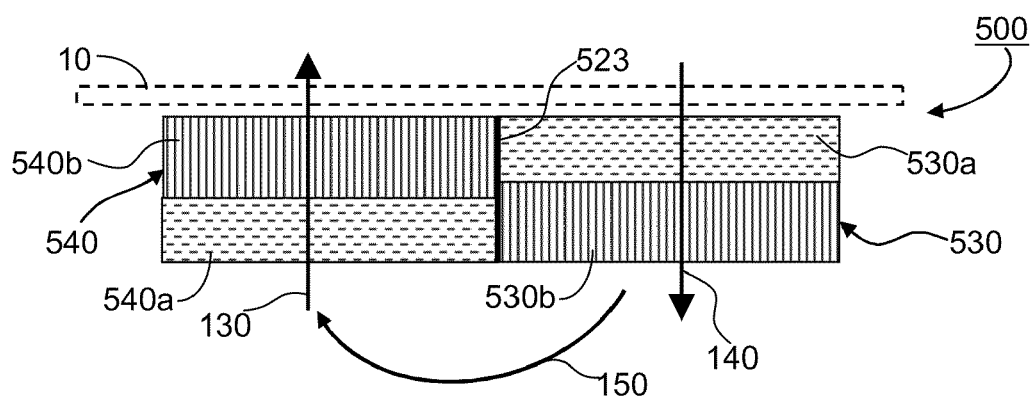
FIG. 13 is a plan view illustration an EHD device configuration in which of EHD devices are staged proximate to respective inlet and outlet portions of a ventilated boundary surface to motivate flow along a generally "U" shaped fluid flow path.

FIG. 13 is a top plan view of a configuration 500 that includes two EHD devices 530 and 540 staged adjacent to one another. EHD device 530 includes corona discharge component 530a and collector electrode component 530b oriented to motivate flow into the enclosure through an inlet portion of partial boundary surface 10. EHD device 540 includes corona discharge component 540a and collector electrode component 540b oriented to motivate flow out of the enclosure through an outlet portion of partial boundary surface 10. EHD devices 530 and 540 proximate to partial boundary surface 10 of an enclosure large enough to contain EHD device 500. The configuration provides the same relatively compact and short path, as defined by arrow 140, arrow 150 and arrow 130, for the flow of fluid through the enclosure as provided by the EHD devices of FIGS. 10A, 10B, 11A and 11B, but achieves the fluid flow path in a different manner.

In the configuration of FIG. 13, when EHD devices are operational, a high voltage power supply (not shown) energizes corona discharge component 530a and collector electrode component 530b of EHD device 530 so as to generate EHD forces in the direction of arrow 140, thereby pulling fluid from outside of the enclosure through an inlet portion of ventilated partial side boundary surface 10 into the enclosure. The high voltage power supply also energizes corona discharge component 540a and collector electrode component 540b of EHD device 540 so as to generate EHD forces in the direction of arrow 130 to force the fluid to exit the enclosure through an outlet portion of ventilated partial side boundary surface 10. The configuration is constructed so as to have an electrical boundary 523 between the EHD devices 530 and 540.

Reversible Flow Configurations

Figure 14A:
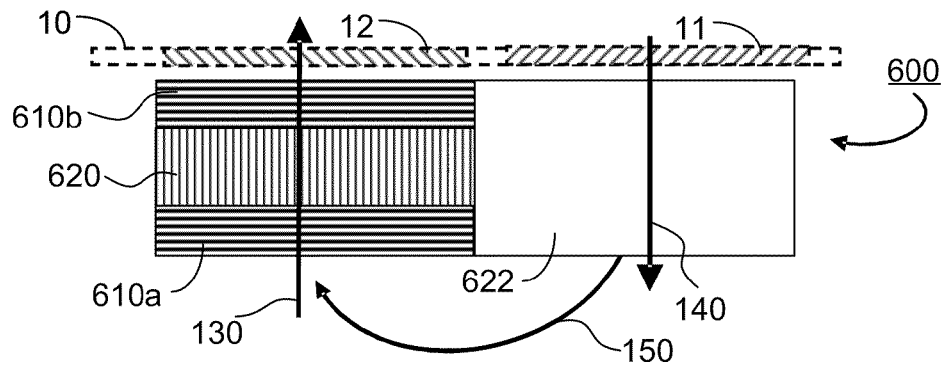
FIGS. 14A and 14B are respective plan view illustrations an EHD device configuration in which two separately energizable corona discharge components are positioned at opposing leading surfaces of an array of collector electrodes to facilitate reversible flow.
Figure 14B:
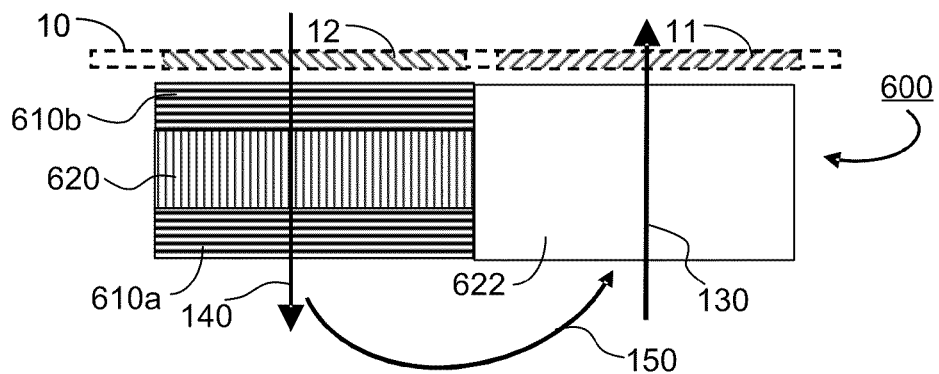

FIGS. 14A and 14B are top plan views of a reversible flow EHD device 600 in accordance with some embodiments of the present invention. Reversible flow EHD device 600 includes corona discharge electrodes 610a and 610b and collector electrodes 620. EHD device 600 is illustrated proximate to a ventilated portion of partial boundary surface 10 of an enclosure large enough to contain EHD device 600. EHD device 600 may be operated in at least two modes.

In one mode of operation, illustrated in FIG. 14A, EHD device 600 is operated to motivate fluid flow along a relatively compact and short path, as defined by arrow 140, arrow 150 and arrow 130, such as that previously illustrated for flow of fluid through an enclosure relative EHD devices 100 and 200 (recall FIGS. 10A and 11A). In this first mode of operation, fluid passes through or over heat transfer surfaces 622 as it enters the enclosure through a first inlet portion 11 of ventilated partial boundary surface 10. A high voltage power supply (not specifically shown) provides a voltage differential between collector electrodes 620 and corona discharge electrodes 610a so as to generate EHD forces in the direction of arrow 130, thereby pulling fluid from inside of the enclosure, including a substantial amount of the fluid entering the enclosure in the direction of arrows 140 and 150 and forcing the fluid through a second outlet portion 12 of ventilated partial boundary surface 10 to exit the enclosure.

With reference to FIG. 14B, in a second mode of operation EHD device 600 motivates fluid flow along a path that is generally opposite that illustrated in FIG. 14A. The high voltage power supply (not specifically shown) provides a voltage differential between collector electrodes 620 and corona discharge electrodes 610b so as to generate EHD forces in the direction of arrow 140, thereby pulling fluid from outside of the enclosure through (now) inlet portion 12 of ventilated partial boundary 10 into the enclosure and then along the fluid flow path defined by arrows 150 and 130 over or through heat transfer surfaces 622 to exit the enclosure through (now) outlet portion 11 of ventilated partial boundary surface 10.

In some embodiments, both collector electrodes 620 and additional heat transfer surfaces 622 are thermally coupled to transfer heat to the EHD motivated fluid flow. In some embodiments, heat transfer surfaces 622 are the dominant heat transfer structures. As with previous configurations, additional heat transfer surfaces 622 may be implemented as an extension of structures that provide collector electrodes 620. Alternatively, in some embodiments, heat transfer surfaces 622 and collector electrodes 620 are implemented as distinct structures that both thermally coupled into heat transfer paths from heat dissipating devices within the enclosure.

Figure 14C:
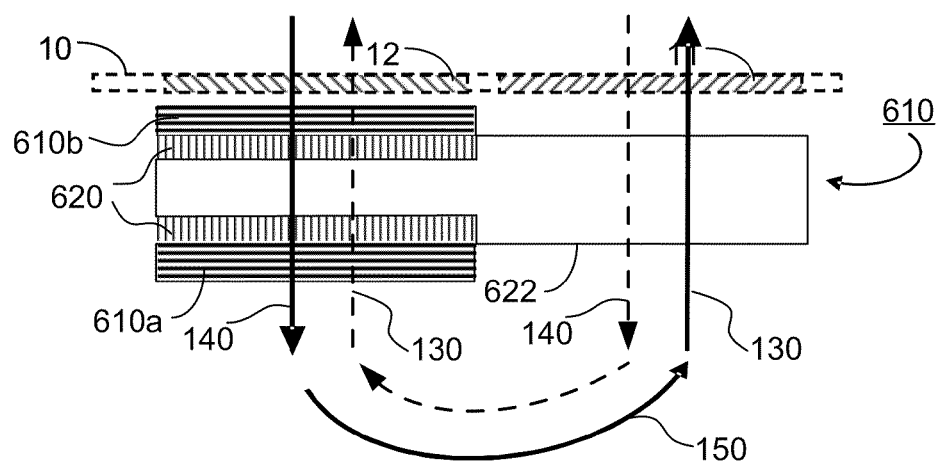
FIG. 14C depicts a variation in which opposing leading surfaces are of respective collector electrodes (or collector electrode portions) separated by additional heat transfer surfaces.

FIG. 14C depicts a further variation in which an array of collector electrodes 620 is at least partially bifurcated by a portion of heat transfer surfaces 622. In the embodiment of FIG. 14C, corona discharge electrodes 610a are positioned proximate to a first array of leading surfaces of respective collector electrodes, such that when energized, fluid flow is motivated in the first flow direction 140. Corona discharge electrodes 610B are correspondingly positioned proximate to a second array of leading surfaces, such that when energized, fluid flow is motivated in second flow direction 130. In each case, motivated fluid flow includes flow through or over the interposed portion of heat transfer surfaces 622. In some embodiments, the illustrated extension of heat transfer surfaces 622 proximate ventilated boundary portion 11 may be omitted or extended consistent with design objectives for a given thermal management solution.

As before, any of a variety of variations on corona discharge and collector electrode geometries and positional interrelationships are envisioned. Based on the description herein, persons of ordinary skill in the art will appreciate variations consistent with alternatives described herein, including alternatives illustrated and described with respect to FIGS. 5-9C, above. Also as before, any of a variety of heat transfer paths may be provided from heat dissipating devices or electronics to heat transfer surfaces 622 and/or to collector electrodes 620, including heat pipes not specifically shown.

Repeated or Plural Configurations

Figure 15:
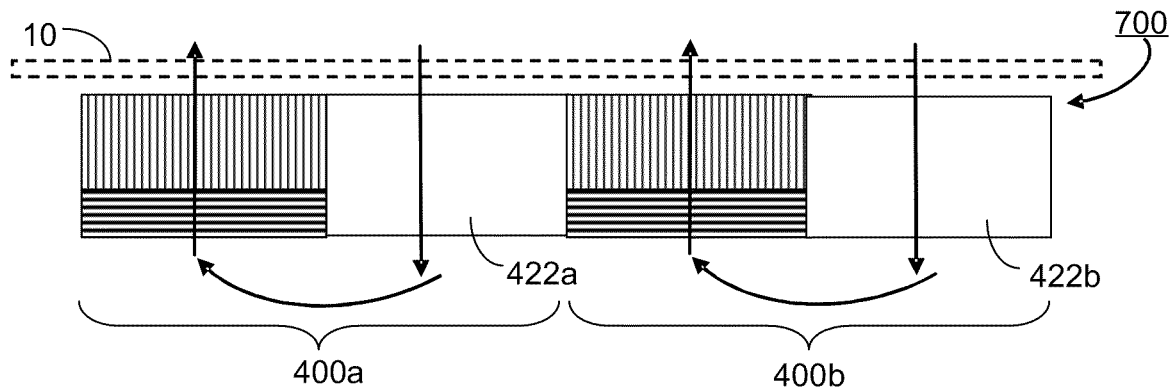
FIG. 15 is a top plan view of a first illustrative pair of EHD devices configured to operate in a cooperative configuration relative to adjacent inlet and outlet portions of a distributed ventilation boundary.

Each of EHD device configurations described herein may be implemented in a repeated plural configuration in order, for example, to improve fluid flow efficiency, to fit into a specific space within an enclosure, or to take advantage of a particular portion of an available ventilated boundary surface. FIG. 15 is a top plan view of an embodiment of EHD device 700 that illustrates one such plural configuration. EHD device 700 includes two EHD device instances (400a and 400b) such as previously illustrated and described with reference to FIGS. 11A-11D. Other embodiments may include additional instances in accord with cooling requirements, space constraints or other design factors. In the illustrated configuration, EHD devices 400a and 400b are positioned proximate to partial boundary surface 10 of an enclosure large enough to contain EHD device 700 and with collector electrodes in a spaced apart configuration. Inlet portions and outlet portions of the ventilation boundary are interspersed in the illustrated configuration. In other configurations, EHD devices 400a and 400b may be positioned with collector electrodes adjacent to each other with corresponding changes to the spatial distribution of inlet portions and outlet portions of the ventilation boundary. Each EHD device (400a and 400b) may be operated by a respective, dedicated high voltage power supply, or both devices may be operated by the same high voltage power supply.

Operation of each EHD device 400a and 400b and the fluid flow paths produced will be understood as described herein (for individual instances) relative to FIGS. 11A, 11B and 110. In general, EHD devices 400a and 400b may be operated simultaneously or independently, according to the needs of the application or function they perform. Additional heat transfer surfaces 422a and 422b which are respectively associated with EHD devices 400a and 400b will also be understood as previously described. As before, heat transfer surfaces 422a and 422b may be implemented as an extension of collector electrode structures or may be distinct, though thermally coupled structures. In some thermal management system embodiments, heat transfer surfaces 422a and 422b may be the dominant heat transfer surfaces. Although, heat transfer surfaces 422a and 422b are illustrated as being of substantially the uniform size, such uniformity is not an implementation requirement. In some embodiments, either or both heat transfer surfaces 422a and 422b may be omitted entirely.

Figure 16:
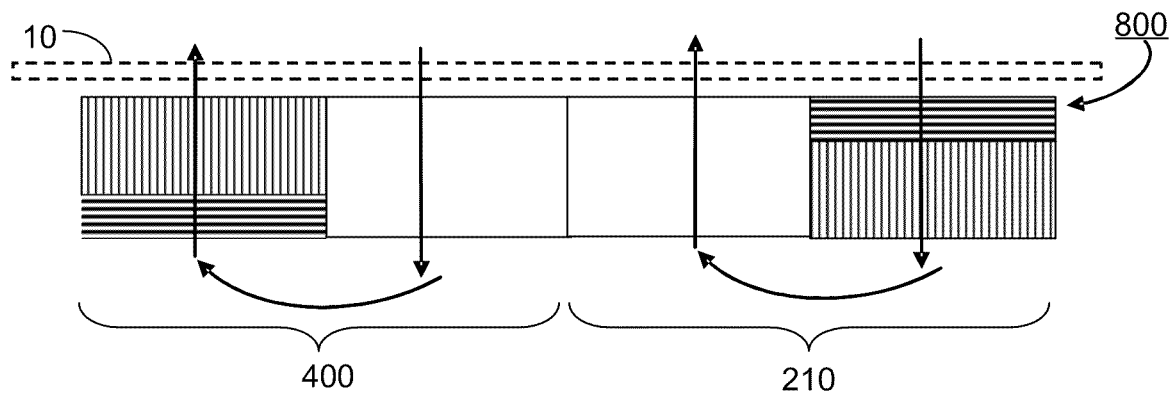
FIG. 16 is a top plan view of a second illustrative pair of EHD devices configured to operate in a cooperative configuration relative to adjacent inlet and outlet portions of a distributed ventilation boundary.

Repeated plural configurations may also be implemented as combinations of dissimilar EHD devices. For example, FIG. 16 is a top plan view of an embodiment of EHD device 800 that illustrates one such plural configuration. EHD device 800 includes an instance of EHD device 400 (recall FIGS. 11A, 11B and 11D) and an instance of EHD device 210 (recall FIG. 11C). Other embodiments may include additional instances in accord with cooling requirements, space constraints or other design factors. In the illustrated configuration, EHD device instances 400 and 210 are positioned proximate to partial boundary surface 10 of an enclosure large enough to contain EHD device 800 and with additional heat transfer surfaces adjacent each other. Inlet portions and outlet portions of the ventilation boundary are interspersed in the illustrated configuration. In other configurations, EHD devices 400 and 210 may be positioned differently with corresponding changes to the spatial distribution of inlet portions and outlet portions of the ventilation boundary. As before, each EHD device (400 and 210) may be operated by a respective, dedicated high voltage power supply, or both devices may be operated by the same high voltage power supply.

As before, additional heat transfer surfaces associated with the EHD device instances (here EHD device 400 and EHD device 210) will be understood as previously described. As before, heat transfer surfaces may be implemented as an extension of collector electrode structures or may be distinct, though thermally coupled structures. In some thermal management system embodiments, heat transfer surfaces other than the collector electrodes may be the dominant heat transfer surfaces and, as before, while heat transfer surfaces are illustrated as substantially uniform in size, such uniformity is not an implementation requirement. Either or both heat transfer surfaces may be omitted entirely in embodiments in which collector electrodes provide substantial heat transfer to motivated fluid flows.

Figure 17:
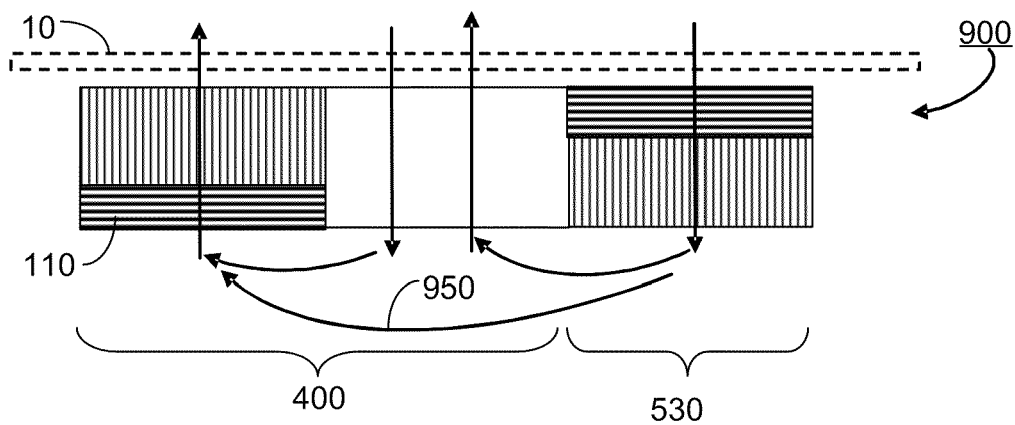
FIGS. 17 and 18 are respective top plan views of additional plural configurations of EHD devices configured to operate in a cooperative configuration with comingled flow paths illustrated.

FIG. 17 is a top plan view of an embodiment of EHD device 900 that illustrates yet another plural configuration. The illustrated configuration includes an EHD device instance 400 (recall FIGS. 11A, 11B and 11D) together with an additional EHD device 530. EHD device 900 is positioned proximate to partial boundary surface 10 of an enclosure large enough to contain EHD device 900. Although a central heat transfer surface is illustrated in association with EHD device instance 400, in some embodiments, heat transfer surfaces may be thermally coupled to collector electrodes of both constituent devices.

As before, each EHD device may be operated by a respective, dedicated high voltage power supply, or both devices may be operated by the same high voltage power supply. The operation of EHD device instances 400 and 530 and the fluid flow paths produced are described above in the description of FIGS. 11A, 11B, 110 and 13. Inlet portions and outlet portions of the ventilation boundary are again interspersed in the illustrated configuration. Note that some amount of the fluid drawn in from the exterior of the enclosure by EHD device instance 530 may also travel along fluid path 950 toward corona discharge electrode 110 of EHD device 400 which will then operate to force the fluid to exit the enclosure.

Figure 18:
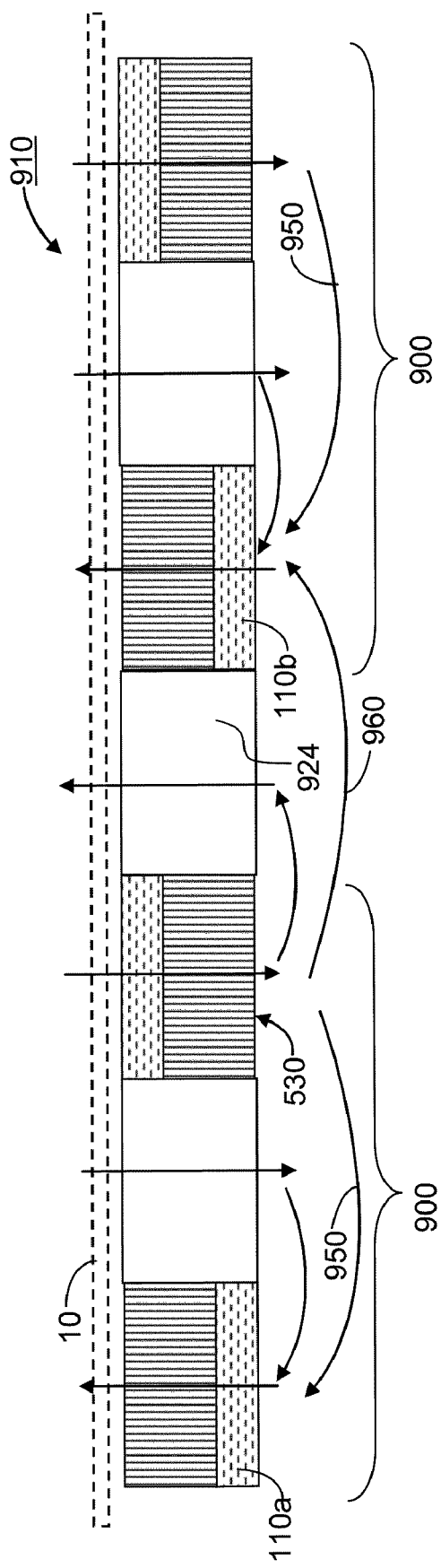

EHD device 900 may itself be replicated in a further plural configuration as illustrated in FIG. 18 as EHD device instance 910. EHD device 910 includes two instances of EHD devices 900 positioned as shown together with additional heat transfer surfaces 924 inserted therebetween. EHD device 910 is positioned proximate to partial boundary surface 10 of an enclosure large enough to contain EHD device 910. Inlet portions and outlet portions of the ventilation boundary are distributed with adjacent inflows and outflows in the illustrated configuration. As before, each of the individual EHD devices of EHD device 910 may be operated independently by a respective dedicated high voltage power supply. Alternatively, some or all of the devices may be operated by the same high voltage power supply. The operation of constituent devices of EHD device 900 and the fluid flow paths produced are as described above relative to respective ones of FIGS. 11A, 11B, 11D, 13 and 17.

As before, some amount of the fluid drawn in from the exterior of the enclosure by EHD device 530 may travel along both fluid paths 950 and 960 toward a neighboring corona discharge electrode (e.g., 110a or 110b) which will then operate to force the fluid to exit the enclosure. The individual EHD devices may be operated simultaneously or independently, according to the needs of the application or function they perform. As before, uniformity of heat transfer surfaces is not an implementation requirement. Likewise, certain heat transfer surfaces may be omitted entirely and thermal coupling amongst heat transfer surfaces and collector electrodes may be adapted in accord with design goals of a particular thermal management system.

EHD Device as Part of a Thermal Management Solution

Figure 19C:
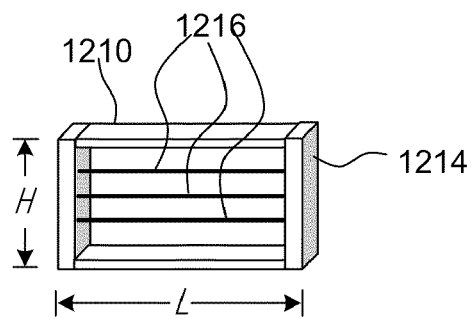
Figure 19C:
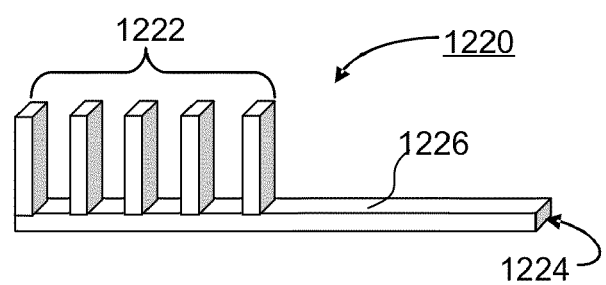
Figure 19C:
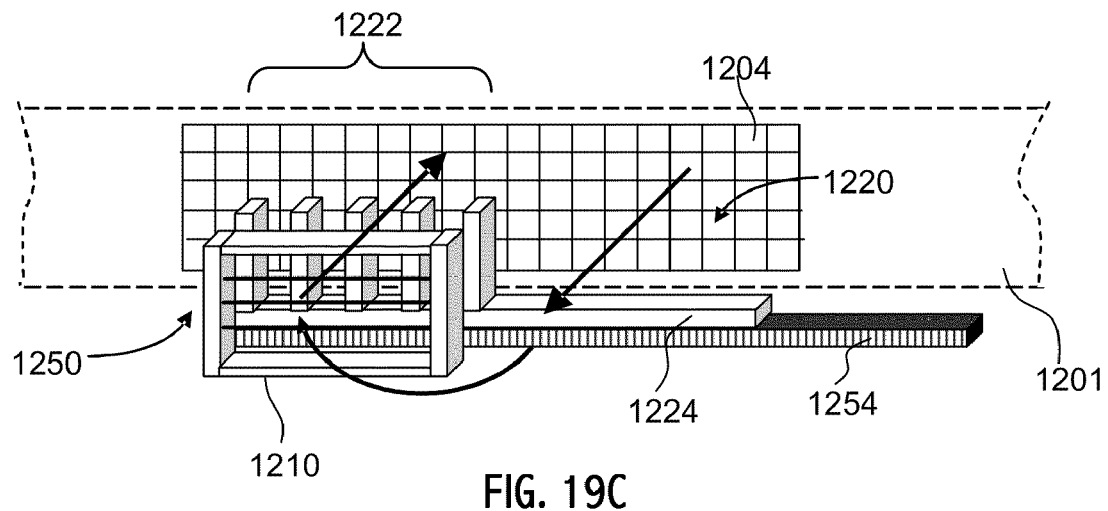

FIGS. 19A, 19B and 19C illustrate EHD device configurations akin to those previously introduced (e.g., with respect to FIGS. 2A, 2B and 2C) in a thermal management solution context. As before, designs for corona discharge electrode and collector electrode assemblies are illustrative and will be understood as but one example amongst the wide range of variations on electrode designs, geometry and positional interrelationships described herein. Accordingly, based on the description herein, persons of ordinary skill in the art will appreciate adaptations of the illustrated thermal management configurations to alternative corona and collector electrode configurations. Indeed, based on the description of FIGS. 19A, 19B and 19C, it will be understood that each of the EHD device configurations described herein may be including as part of a similar thermal management system for dissipating heat generated by one or more thermal sources.

FIG. 19A is a schematic drawing of corona discharge electrode component 1210 including a plurality of corona wires 1216 supported by a frame 1214. FIG. 19B is a schematic drawing of a first embodiment of a convective heat transfer component. Convective heat transfer component 1220 includes collector electrode array 1222 and sub-component 1224 having a convective surface 1226. Collector electrode array 1222 includes a plurality of vertically disposed unit structures each of which may function as a collector electrode. Sub-component 1224 may also serve as a support for the vertical collector electrodes of collector electrode array 1222, as shown in FIG. 12B, or it may be a separate structure. In general, there is no requirement that the sub-components that comprise convective heat transfer component 1220 be either distinct physical entities from one another, or that they be constructed as a single integral structure. For example, in some embodiments, collector electrode array 1222 and sub-component 1224 may be electrically isolated from each other during operation of the EHD device, but are constructed to be thermally connected.

In some embodiments, collector electrode array 1222 may function both as a collector electrode array and as a heat sink, and sub-component 1224 may function as a thermal conduit such as a heat pipe. As defined herein, a heat sink is an object that absorbs and dissipates heat from another object using either direct or radiant thermal contact. When sub-component 1224 functions as a thermal conduit, it is preferable, but not necessary, to electrically isolate it from the thermal source using a thermal interface material and to maintain a thermal connection between sub-component 1224 and collector electrode array 1222. Further, when sub-component 1224 functions as a thermal conduit, it need not also function as a support for the unit structures of collector electrode array 1222; it is sufficient that thermal conduit 1224 come in contact with each of the unit structures of collector electrode array 1222 such that collector electrode array 1222 absorbs heat from thermal conduit 1224.

FIG. 19C illustrates EHD device 1250 configured for dissipating heat from a thermal source. EHD device 1250 includes corona discharge electrode component 1210 and convective heat transfer component 1220 (as previously described with reference to FIGS. 19A and 19B) positioned proximate to a ventilated boundary portion 1204 of partial boundary surface 1201 of an enclosure containing the thermal source. In EHD device 1200, collector electrode array 1222 functions both as a collector electrode array and as a heat sink. Sub-component 1224 is constructed as a convective heat transfer surface and functions as a heat spreader. Thermal conduit 1254 transports heat from a thermal source disposed in the interior of the enclosure to both collector electrode array 1222 and convective heat transfer surfaces of sub-component 1224. The extent of the path and configuration of thermal conduit 1254 from the thermal source within the enclosure are not shown. In the illustrated embodiment, ventilated portion 1204 of partial boundary surface 1201 includes an inlet portion that admits ambient air from outside of the apparatus into the enclosure that houses EHD device 1250 and an outlet portion that allows for heated air inside the enclosure to exit the enclosure. In operation, EHD device 1250 produces an air flow path from the inlet portion to the outlet portion along the arrows as shown.

Figure 19D:
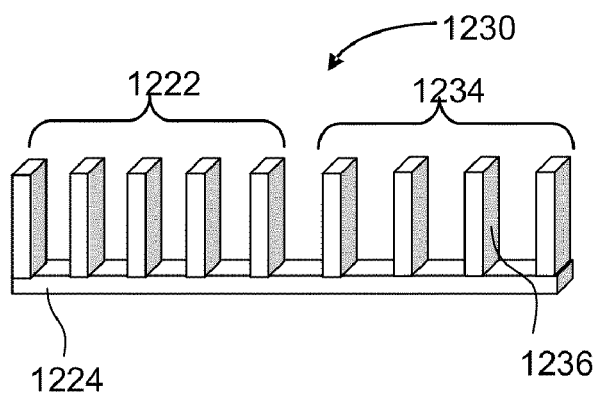
FIG. 19D is a schematic drawing of an alternative design for a convective heat transfer component.

FIG. 19D is a schematic drawing of an alternative design for the previously described convective heat transfer component. Alternative convective heat transfer component 1230 includes collector electrode array 1222 (as illustrated in FIG. 19C) together with an extension 1234 of the vertically disposed unit structures having the same or similar design as corresponding structures of collector electrode array 1222. The individual unit structures in sub-components 1222 and 1234 each have convective surfaces such as surface 1236 and increase the surface area for heat transfer when compared with the embodiment of FIG. 19B. In some embodiments, structure and/or spacing of the vertically disposed convective heat transfer structures along extension 1234 may differ from those that constitute collector electrode array 1222. For example, in some embodiments, a more widely spacing is provided for convective heat transfer structures along extension 1234. In any case, although extension 1234 has the same or similar design as collector electrode array 1222, without closely spaced corona discharge electrodes extension 1234 does not function as a collector electrode array.

Figure 19E:
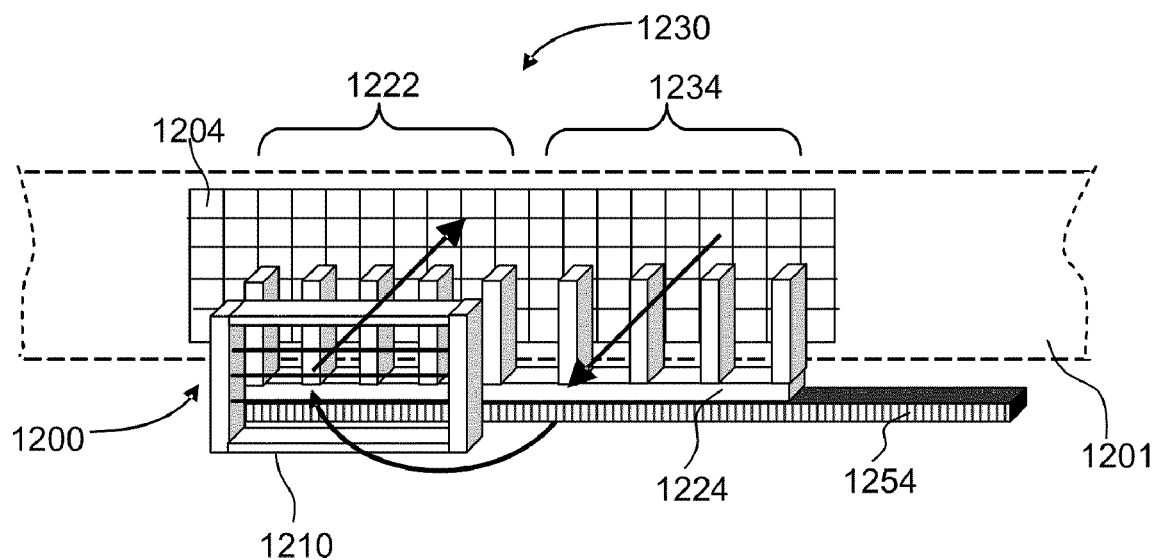
FIG. 19E illustrates an EHD device configuration that includes corona discharge electrode and convective heat transfer components of FIGS. 19A and 19D and employs convective heat transfer structures along an extension surface for dissipating heat from a thermal source.

FIG. 19E illustrates an EHD device 1200 configuration that employs convective heat transfer structures along extension 1234 for dissipating heat from a thermal source. EHD device 1200 is a variation of EHD device 1250 of FIG. 19C in which collector electrode array 1222 functions as a both collector electrode array and as a heat sink, but in which additional convective heat transfer structures along extension 1234 contribute to heat transfer. EHD device 1200 further comprises thermal conduit 1254, which directs heat from a thermal source disposed in the interior of the enclosure to collector electrode array 1222. The extent of the path and the configuration of thermal conduit 1254 from the thermal source within the enclosure are not shown. In operation, EHD device 1200 produces substantially the same air flow path into and out of the enclosure of the apparatus as produced by EHD device 1250.

While FIGS. 19C and 19E illustrate EHD devices 1250 and 1200 proximate a single boundary surface of the enclosure, it is understood that either EHD device 1250 or 1200 may also be disposed in an enclosure in the positions illustrated in FIG. 3 or 4 so as to produce an air flow path between two ventilated boundary surfaces of the enclosure. While vertical unit structures in FIGS. 19A-19E are shown for illustrative purposes as resembling the protrusions commonly found as part of a conventional heat sink, it is to be understood that other designs and configurations of conductive surfaces and collector electrodes may be used in the convective components of the embodiments of the EHD devices described herein.

Design Adaptations for Particular Thermal Management Systems

EHD devices illustrated herein may be constructed in a wide range of sizes in order to meet the requirements of a particular thermal heat management solution. By way of one example, when EHD device 1250 of FIG. 19C is configured for dissipating heat from an electronic circuit in an electronic apparatus, corona discharge electrode assembly 1210 (see FIG. 19A) may have a height, H, in the range of 0.5 mm to 30 mm, and a length, L, chosen to meet the needs of the particular enclosure within which the EHD device will operate. When the corona discharge electrode component comprises multiple corona discharge electrodes such as in corona discharge electrode assembly 1210 (see FIG. 19A), the distance between adjacent corona discharge electrodes 1216 may be approximately 2-4 mm. Such a device may be suitable for use in an electronic device having a thin form factor. Note that the scale of the individual components shown in the Figures herein is solely for illustration purposes; each component may have height, width and depth dimensions that are different from the relative dimensions shown in a particular Figure.

Many discussions of the performance of an EHD device focus on techniques and electrode configurations (e.g., device geometries) that attempt to improve the velocity or pressure at which fluid moves through the device, or through the enclosure within which the device operates, in order to achieve an improved fluid flow rate. Various EHD device designs illustrated herein, when used as a component in a thermal management system, may be adapted to achieve a target fluid flow rate that is sufficient to dissipate a target heat quantity generated by a particular one or more thermal sources contained within an enclosure, while operating the EHD device under the constraint of a given pressure head range. Once the target fluid flow rate and target heat quantity are known, the design of such an EHD device begins with determining the geometry and fluid flow resistance of the device that will permit the operation of an EHD device within the desired pressure head range. In some embodiments, an EHD device may be configured to operate with a pressure head in the range of 1-20 Pa. For some thermal management applications, the desired, or target, pressure head range may be a range of 3-7 Pa.

Figures 20, 21:
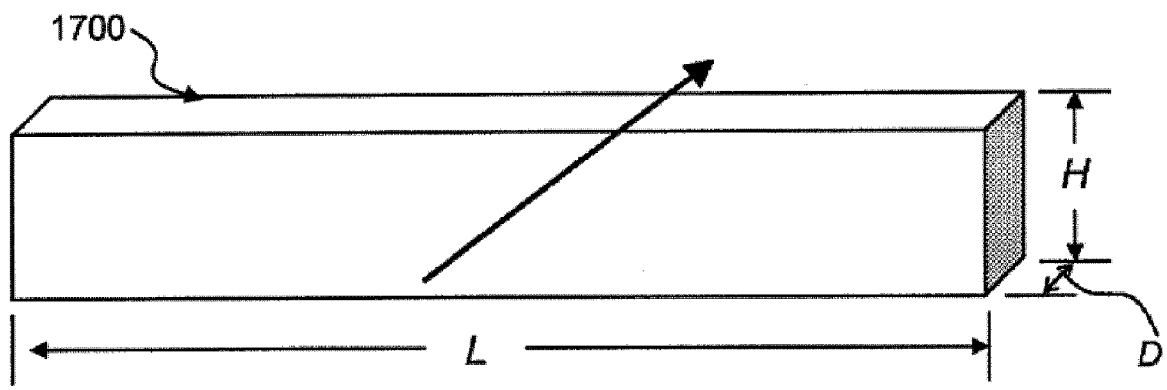
FIG. 20 is a volumetric illustration of an EHD device having a certain geometry expressed as a ratio of length to height, or length to depth.
FIG. 21 is table of design parameters for representative implementations of various EHD device embodiments described and illustrated herein.

In general, EHD devices described herein may be configured to have a high aspect ratio and positioned within the enclosure proximate to one or more ventilated surface boundaries in order to minimize resistance along the fluid flow path, according to one of the illustrated embodiments. With reference to FIG. 20, assume that structure 1700 is an EHD device of the type illustrated in FIG. 19C including collector electrodes (e.g., collector electrode assembly 1230 that also functions as a heat sink) and additional heat transfer surfaces (e.g., as provided by sub-component 1224) that function as a heat spreader to direct heat from a thermal source to the array of collector electrodes. A high-aspect ratio EHD device is defined herein as having at least one of the following relationships:

$$5 < L/H < 300 \quad (1)$$

or $$5 < L/D < 150, \quad (2)$$

where L is the length of the device, H is the height of the device, and D is the depth of the device, where the depth of the device is along the fluid flow path. In some embodiments of an EHD device, these relationships may preferably be stated as:

$$10 < L/H < 40 \quad (3)$$

or $$10 < L/D < 30. \quad (4)$$

When the EHD device is configured according to the relationships of any one of Equations (1)-(4), and the EHD device is positioned proximate to one or more ventilated boundary surfaces as illustrated herein to produce a substantially compact fluid flow path, the EHD device should operate within the desired pressure head range. The operational pressure head of the EHD device will produce a fluid flow velocity through the collector electrode array component and at the output of the device sufficient to achieve the target fluid flow rate that is needed to dissipate the target heat quantity. Given the pressure head ranges and EHD device aspect ratios recited above, the fluid flow velocity is expected to be in the range of 0.1-3 m/s in some embodiments, and preferably in the range of 0.2-1.5 m/s in other embodiments.

FIG. 21 summarizes the ranges of the several factors discussed above. In addition, in some configurations of an EHD device according to these designs, the device operation will maximize the dissipation of heat from the thermal source while maintaining a substantial equilibrium of the fluid flow velocity through the enclosure within which the EHD device operates. That is, the device will maintain a fluid flow velocity at the intake ventilated boundary surface that is substantially equal to the fluid flow velocity at the outgoing ventilated boundary surface. Note that EHD device 1700 of FIG. 20 is represented in a substantially rectangular form. It is understood that this is for illustration purposes only; the actual shape of the EHD device is dependent on the configuration of the collector electrodes and the position of any associated thermal management components such as a heat pipe. It is sufficient that the EHD device have a length, height and depth by which the ratios of Equations (1) through (4) may be satisfied.

Other Embodiments

While the techniques and implementations of the EHD devices discussed herein have been described with reference to exemplary embodiments, it will be understood by those skilled in the art that various changes may be made and equivalents may be substituted for elements thereof without departing from the scope of the appended claims. In addition, many modifications may be made to adapt a particular situation or material to the teachings without departing from the essential scope thereof. Therefore, the particular embodiments, implementations and techniques disclosed herein, some of which indicate the best mode contemplated for carrying out these embodiments, implementations and techniques, are not intended to limit the scope of the appended claims.

What is claimed is:

1. An electrohydrodynamic fluid accelerator comprising:
an array of collector electrodes; and
first and second sets of one or more corona discharge electrodes, each having a longitudinal extent spanning a major dimension of the collector electrode array,
wherein the first set is positioned relative to first leading surfaces of at least a subset of the collector electrodes to, when energized, motivate fluid in a first flow direction through the collector electrode array, and
wherein the second set is positioned relative to second leading surfaces of at least a subset of the collector electrodes to, when energized, motivate fluid through the collector electrode array in a second flow direction that differs from the first flow direction.

2. The electrohydrodynamic fluid accelerator of claim 1, wherein the first and second leading surfaces are opposing surfaces of individual ones of the collector electrodes.

3. The electrohydrodynamic fluid accelerator of claim 1, wherein the first and second leading surfaces are opposing surfaces of respective subsets of the collector electrodes.

4. The electrohydrodynamic fluid accelerator of claim 1, further comprising:
additional heat transfer surfaces interposed between the respective subsets of the collector electrodes.

5. The electrohydrodynamic fluid accelerator of claim 1, further comprising:
a high voltage source coupled to selectively energize either one or the other of the first and second sets of corona discharge electrodes.

6. The electrohydrodynamic fluid accelerator of claim 1, wherein the first and second flow directions are generally opposing flow directions.

7. The electrohydrodynamic fluid accelerator of claim 1, wherein the first and second sets of corona discharge electrodes are positioned on opposing sides of the collector electrode array.

8. The electrohydrodynamic fluid accelerator of claim 1, wherein collector electrodes of the collector electrode array are spaced apart and have generally planar portions extending in a direction generally parallel to the first and second flow directions.

9. The electrohydrodynamic fluid accelerator of claim 8, wherein the collector electrodes are oriented such that lateral extent of the generally planar portions thereof is generally orthogonally to the longitudinal extent of the corona discharge electrodes.

10. The electrohydrodynamic fluid accelerator of claim 1, wherein the collector electrodes are oriented such that leading surfaces thereof are generally parallel to the longitudinal extent of the corona discharge electrodes.

11. The electrohydrodynamic fluid accelerator of claim 1, wherein the first set of corona discharge electrodes consists of a single corona discharge electrode.

12. The electrohydrodynamic fluid accelerator of claim 11, wherein the collector electrodes each present a curved leading profile displaced from the single corona discharge electrode, the collector electrodes and the single corona discharge electrode operatively coupled between terminals of a high voltage source to establish a corona discharge therebetween and thereby accelerate the fluid flow in the first flow direction.

13. The electrohydrodynamic fluid accelerator of claim 11, wherein the collector electrodes each present a leading surface displaced from the single corona discharge electrode, the leading surfaces arranged with respect to the single corona discharge electrode to present a generally curved array thereof, the collector electrodes and the single corona discharge electrode operatively coupled between terminals of a high voltage source to establish a corona discharge therebetween and thereby accelerate the fluid flow in the first flow direction.

14. The electrohydrodynamic fluid accelerator of claim 11, wherein the second set of corona discharge electrodes also consists of a single corona discharge electrode.

15. The electrohydrodynamic fluid accelerator of claim 1, wherein collector electrodes are thermally coupled as part of a heat transfer path to exchange heat with the motivated fluid flow.

16. The electrohydrodynamic fluid accelerator of claim 1, disposed in a flow path for ventilating an enclosure and thereby cooling one or more devices within the enclosure,
wherein the collector electrodes are thermally coupled into a heat transfer path from the devices, and
wherein fluid flow motivated through the collector electrode array dissipates heat therefrom.

17. The electrohydrodynamic fluid accelerator of claim 1, disposed in a flow path for ventilating an enclosure and thereby cooling one or more devices within the enclosure, further comprising:
heat transfer surfaces thermally coupled into a heat transfer path from the devices, and
wherein fluid flow motivated through the collector electrode array further dissipates heat from the heat transfer surfaces.

18. A method comprising:
operating an electrohydrodynamic fluid accelerator that includes an array of collector electrodes to, at a first time, motivate fluid in a first flow direction; and
operating the electrohydrodynamic fluid accelerator to, at a second time, motivate fluid in a second flow direction,
wherein the electrohydrodynamic fluid accelerator includes at least first and second corona discharge electrodes disposed on different sides of the collector electrode array and each having a longitudinal extent that spans a major dimension of the collector electrode array,
wherein at the first time, the first corona discharge electrode is selectively coupled to a high voltage source to establish a corona discharge and thereby accelerate the fluid flow in the first flow direction, and
wherein at the second time, the second corona discharge electrode is selectively coupled to the high voltage source to establish a corona discharge and thereby accelerate the fluid flow in the second flow direction.

19. The method of claim 18, further comprising:
alternating between the first and second flow directions.

20. The method of claim 18,
wherein the different sides are generally opposing sides; and
wherein the first and second flow directions are generally opposing flow directions.

21. An apparatus comprising:
an enclosure;
a flow path for conveyance of air between ventilated boundary portions of the enclosure; and
an electrohydrodynamic fluid accelerator disposed in the flow path for ventilating the enclosure and thereby cooling one or more devices disposed therein, the electrohydrodynamic fluid accelerator operable at first and second times to accelerate flow of the air in respective, and differing, first and second flow directions.

22. The apparatus of claim 21,
the electrohydrodynamic fluid accelerator including an array of collector electrodes and at least first and second corona discharge electrodes disposed on a different sides of the collector electrode array, each having a longitudinal extent that spans a major dimension of the collector electrode array, the first set positioned relative to first leading surfaces of at least a subset of the collector electrodes to, when energized, motivate fluid in a first flow direction through the collector electrode array, and the second set positioned relative to second leading surfaces of at least a subset of the collector electrodes to, when energized, motivate fluid through the collector electrode array in a second flow direction that opposes the first flow direction.

23. The apparatus of claim 21,
the electrohydrodynamic fluid accelerator including a spaced apart array of collector electrodes and at least first and second corona discharge electrodes disposed on different sides of the collector electrode array, each having a longitudinal extent that spans a major dimension of the collector electrode array.

24. The apparatus of claim 23, further comprising:
a heat transfer path from the one or more devices to the collector electrodes.

25. The apparatus of claim 21, further comprising:
heat transfer surfaces disposed in the flow path; and
a heat transfer path from the one or more devices to the heat transfer surfaces.

26. The apparatus of claim 23,
wherein the different sides are generally opposing sides; and
wherein the first and second flow directions are generally opposing flow directions.

* * * * *